United States Patent
Kaulgud et al.

(10) Patent No.: US 9,798,298 B2
(45) Date of Patent: Oct. 24, 2017

(54) COMMUNITY ENERGY MANAGEMENT SYSTEM

(71) Applicant: Accenture Global Services Limited, Dublin (IE)

(72) Inventors: Vikrant Shyamkant Kaulgud, Maharashtra (IN); Sanjoy Paul, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 395 days.

(21) Appl. No.: 13/772,557

(22) Filed: Feb. 21, 2013

(65) Prior Publication Data

US 2013/0262197 A1 Oct. 3, 2013

(30) Foreign Application Priority Data

Apr. 2, 2012 (IN) .......................... 1299/CHE/2012
Oct. 29, 2012 (IN) ............................ 1299CHE2012

(51) Int. Cl.
*G05B 13/02* (2006.01)
*H02J 3/14* (2006.01)
(Continued)

(52) U.S. Cl.
CPC ................ *G05B 13/02* (2013.01); *H02J 3/14* (2013.01); *G06Q 10/06375* (2013.01);
(Continued)

(58) Field of Classification Search
CPC ................................................ G06Q 30/0207
(Continued)

(56) References Cited

U.S. PATENT DOCUMENTS 5,696,695 A    12/1997  Ehlers et al.
6,583,521 B1 *  6/2003  Lagod ................... H02J 3/005
                                                   307/29
(Continued)

FOREIGN PATENT DOCUMENTS

CA       2 729 211 A1    7/2011
EP       2081273         7/2009
(Continued)

OTHER PUBLICATIONS

European Search Report and Written Opinion from corresponding European Application No. 10 30 5078 dated Jun. 9, 2010 (8 pages).

(Continued)

*Primary Examiner* — Amanda Abrahamson
*Assistant Examiner* — Romeo R Smellie
(74) *Attorney, Agent, or Firm* — Brinks Gilson & Lione

(57) ABSTRACT

Systems and methods for distributed control and energy management of one or more communities of energy-consuming units may include aggregation of consumption data from units, and determining per-unit electricity consumption based thereon, including consumption of backup power provided by a community during periods of time of poor quality (brownouts) or blackouts of a utility. A system may calculate and assess to respective units per-unit costs for such backup power. A system may also issue a command or alert to units to carry out one or both of community electricity usage objectives and electricity quotas required by the utility, which may be determined through execution of rules.

18 Claims, 15 Drawing Sheets

(51) Int. Cl.
  *G06Q 50/06* (2012.01)
  *H02J 3/00* (2006.01)
  *G06Q 10/06* (2012.01)

(52) U.S. Cl.
  CPC ....... *G06Q 10/06395* (2013.01); *G06Q 50/06* (2013.01); *H02J 2003/001* (2013.01); *H02J 2003/003* (2013.01); *H02J 2003/007* (2013.01); *Y02B 70/3225* (2013.01); *Y02E 60/76* (2013.01); *Y04S 10/54* (2013.01); *Y04S 20/222* (2013.01); *Y04S 40/22* (2013.01)

(58) Field of Classification Search
  USPC ................................................ 705/412, 14.1
  See application file for complete search history.

(56) References Cited

U.S. PATENT DOCUMENTS

| | | | | |
|---|---|---|---|---|
| 7,379,997 | B2* | 5/2008 | Ehlers | F24F 11/0012 702/182 |
| 8,176,095 | B2 | 5/2012 | Murray et al. | |
| 8,239,073 | B2 | 8/2012 | Fausak et al. | |
| 2002/0072868 | A1 | 6/2002 | Bartone et al. | |
| 2004/0260430 | A1 | 12/2004 | Mansingh et al. | |
| 2005/0240427 | A1 | 10/2005 | Crichlow | |
| 2007/0010916 | A1* | 1/2007 | Rodgers | H02J 3/14 700/295 |
| 2007/0239317 | A1* | 10/2007 | Bogolea | B60H 1/0065 700/276 |
| 2008/0177423 | A1 | 7/2008 | Brickfield et al. | |
| 2008/0177678 | A1* | 7/2008 | Di Martini | G01D 4/002 705/412 |
| 2008/0306985 | A1 | 12/2008 | Murray et al. | |
| 2009/0045804 | A1 | 2/2009 | Durling et al. | |
| 2009/0062970 | A1 | 3/2009 | Forbes et al. | |
| 2009/0276771 | A1 | 11/2009 | Nickolov et al. | |
| 2009/0326725 | A1 | 12/2009 | Carlson et al. | |
| 2010/0088261 | A1* | 4/2010 | Montalvo | H02J 3/14 706/15 |
| 2010/0292856 | A1 | 11/2010 | Fujita | |
| 2011/0022242 | A1* | 1/2011 | Bukhin | G06Q 10/06 700/291 |
| 2011/0153107 | A1* | 6/2011 | Kim | G06F 1/3203 700/295 |
| 2012/0078432 | A1 | 3/2012 | Weatherhead et al. | |
| 2012/0089269 | A1* | 4/2012 | Weaver | H02J 3/14 700/295 |
| 2013/0079931 | A1* | 3/2013 | Wanchoo | G01D 4/002 700/278 |

FOREIGN PATENT DOCUMENTS

| | | |
|---|---|---|
| EP | 2 290 328 A1 | 3/2011 |
| SE | 1100591 A1 | 8/2011 |
| WO | WO 01/71881 A2 | 9/2001 |
| WO | WO 03/085798 | 10/2003 |
| WO | WO 2005/040992 | 5/2005 |
| WO | WO 2007/121322 | 10/2007 |
| WO | WO 2008/088219 A1 | 7/2008 |

OTHER PUBLICATIONS

Examiner's First Report from corresponding Australian Patent Application No. 2011200317 dated Feb. 21, 2011 (2 pages).
First Office Action from U.S. Appl. No. 13/012,331 dated Jan. 28, 2013 (21 pages).
Extended European Search Report, dated Aug. 2, 2013, pp. 1-7, issued in European Patent Application No. 13161811.8, European Patent Office, Munich, Germany.
Final Office Action, dated Jul. 19, 2013, pp. 1-29, issued in U.S. Appl. No. 13/012,331, U.S. Patent and Trademark Office, Alexandria, VA.
Non-Final Office Action, dated Feb. 11, 2014, pp. 1-29, issued in U.S. Appl. No. 13/012,331, U.S. Patent and Trademark Office, Alexandria, VA.
Notice of Allowance, dated Aug. 18, 2014, pp. 1-14, issued in U.S. Appl. No. 13/012,331, U.S. Patent and Trademark Office, Alexandria, VA.
Examination Report No. 2, dated Mar. 28, 2012, pp. 1-2, issued in Australia Patent Application No. 2011200317, IP Australia, Woden, ACT, Australia.
Examination Report No. 3, dated Sep. 21, 2012, pp. 1-2, issued in Australia Patent Application No. 2011200317, IP Australia, Woden, ACT, Australia.

* cited by examiner

COMMUNITY ENERGY MANAGEMENT SYSTEM

CROSS-REFERENCE TO RELATED APPLICATIONS

This application claims the benefit of priority to India Patent Application No. 1299/CHE/2012, filed as a provisional application on Apr. 2, 2012, and to India Patent Application No. 1299/CHE/2012 filed as a non-provisional application on Oct. 26, 2012, both of which are incorporated by this reference.

BACKGROUND

1. Field of the Disclosure

The present disclosure relates generally to systems and methods for decentralized analysis and control of power consumption in a power grid. More specifically, the present disclosure relates to a community energy management system that analyzes and controls power to consuming units within a community, including analyzing usage in the consuming units and controlling supply of backup power and demand response.

2. Background

In developed nations, during extreme summer days, demand for electricity peaks due to heavy usage of appliances, such as air conditioning. Utility companies, in order to handle the unexpected peak load, are forced to source the additional supply at a hefty premium. Ideally, utilities would like to control peak load in order to avoid sourcing power at an exorbitant price.

In emerging markets such as, for example, India, the supply of energy continuously lags behind demand. The current gap between peak demand and supply in India is approximately 12% for power and 1% for energy. As a result, there is typically less power than is desired.

In order to bring the demand below supply, utility companies simply shut off the supply of electricity to different areas of a city as per a scheduled—and many times an unscheduled—plan. This phenomenon forces rolling electricity shut down in emerging markets known as a blackout or load shedding. Rolling blackouts negatively affect the day-to-day lives of consumers. Brownouts, or degradation in power quality that may seriously affect appliance or device functionality, may often occur in addition to blackouts.

At community levels, a community of individual energy-consuming units (such as units, apartments, condos, industrial units and the like) typically provides backup generator power to the units during blackouts. The backup generator is usually a diesel-powered generator that is switched on either manually or automatically when electricity is cut (blackout) from the utility. When the generators come on, they provide all the electricity for the community during the blackout. The community (e.g., apartment complex) usually then charges each unit an equal percentage of the cost of maintaining the backup generators regardless of how much electricity or power was consumed during the time that the backup generators were operational. This may leave some unit owners frustrated, knowing some of their neighbors have appliances of far greater energy consumption.

Problems resulting from mismatch of power demand and supply are likely to worsen in countries over the next couple of decades. For example, given the 8.5% gross domestic product (GDP) growth rate of India, the demand for electricity in India is expected to more than double by 2020 to 400,000 MW and become more than four times current levels, or 950,000 MW, by 2030. The current production capacity is pegged at 150,000 MW. This implies issues with the widening supply-demand gap in electrical power in India.

While the government is working to increase production, the gap is widening due to increased consumption. To eliminate a power crisis, especially during the peak load periods, developed nations have proposed leveraging the sophisticated smart grid infrastructure that uses smart meters to monitor usage and demand of energy. This infrastructure employs a control center to send signals to smart appliances or smart meters to either provide price per unit increases at peak load time or to execute demand response in which certain loads are temporarily, but intelligently, shed in order to reduce load. The intelligence varies, but is usually to shed loads across multiple customers and in a way that is most convenient to the utility, for instance, in a way that is easy to track and account for in customer bills.

However, a smart grid solution may not be feasible in emerging markets for multiple reasons, a few of which include: (1) lack of smart grid infrastructure; (2) the prohibitive costs of deploying smart meters and smart appliances; and (3) the inability to scale to a level that would allow sufficient control to prevent rolling blackouts. Therefore, a need exists to better address the problems of excess demand.

BRIEF SUMMARY

A community energy management system (CEMS) for distributed control and energy management of one or more communities of energy-consuming units may aggregate consumption data from units, and determine per-unit electricity consumption based thereon, including consumption of backup power provided by a community during periods of time of poor quality electricity (brownouts) or cut electricity (blackouts) of a utility. The CEMS may calculate and assess to respective units per-unit costs for such backup power. The backup power may be any source of power outside of a regular power grid. For instance, backup power may come from a generator or from some other source of energy, such as from batteries, solar panels or cells, wind mills, or other sources of green energy.

A CEMS may also issue a command or alert to units to carry out one or both of community electricity usage objectives and electricity quotas required by the utility, which may be determined through execution of rules. Smart device management systems (SDMSs) at units may execute the command—or unit owners may react to alerts—to reduce or cut electricity consumption by certain appliances. In a CEMS of hierarchical monitoring of the provision of electricity by the utility and unit-level consumption of the electricity, a third party provider system (which may be another CEMS) may control a group of one or more CEMS's in the ways herein disclosed in relation to a single CEMS. Such a hierarchical management system allows, for instance, a county or region-level CEMS to control an aggregation of township or city CEMSs. The functions of a typical CEMS may be distributed to more than one CEMS, and this may be done in a hierarchical manner. For instance, a higher-level CEMS may provide intelligence and analysis of data gathered by lower-level CEMS's from a plurality of communities.

In one CEMS that employs a computer having at least one processor and memory, the system monitors, using a sensor of the CEMS, electricity supplied to a community by monitoring a feeder line from a local utility, the community including a plurality of consuming units, the community being a subset of a power grid. The CEMS detects a reduction or loss in electricity supplied by the local utility during one or more time periods for which backup power will have to be provided. The CEMS monitors, using at least one sensor of the CEMS, electricity consumption at the plurality of units. The CEMS can then determine, using the at least one processor, backup power consumed on a per-unit basis during the one or more time periods; and calculate costs to respective units based on per-unit consumption of the backup power during the one or more time periods.

Another or the same CEMS monitors electricity consumption by a community by monitoring a feeder line from a local utility, including periods of time during which the electricity is cut, which form incoming electricity patterns of supply. The CEMS receives data from a plurality of units of a community that consume the electricity, the data including at least consumption patterns on a per-unit basis. The CEMS then calculates total community consumption and consumption patterns of the community based on at least the received data. The CEMS compares the community consumption patterns with the incoming electricity patterns from the local utility to determine quantities of electricity supply shortages during the periods of time. The CEMS calculates an amount of backup power required by respective units during the electricity supply shortages and a cost to the community to supply the backup power. The CEMS may the charge respective units the calculated costs.

In a third party service provider system (or CEMS) that uses a computer having at least one processor and memory, the system monitors electricity consumption by a plurality of communities by monitoring respective feeder lines from a local utility for each community, including periods of time during which the electricity is cut or reduced, which form incoming electricity patterns of supply for the respective communities. The communities as combined make up a subset of a power grid. The system aggregates data from each community for a plurality of units that consume the electricity, the data including at least consumption patterns on a per-unit basis. The system accesses one or more rules from memory, or as received from the local utility, that address demand response requirements of the local utility executable at a micro level of the units, to determine a reduction in power supply at each monitored community necessary to reduce a likelihood of a blackout or a brownout in the local utility. The system then sends an alert or command to a smart device management system (SDMS) of respective units of the communities based on the incoming energy patterns and the per-unit consumption patterns, and in execution of the one or more rules to reduce a likelihood of a blackout or a brownout in the local utility.

With reference to a CEMS that controls power consumption in a power grid system, the power grid system includes a central authority, the CEMS, and a plurality of consuming units. The CEMS controls a community of the consuming units being less than all of the plurality of consuming units. A method may be executed by the CEMS wherein the CEMS receives at least one rule from the central authority, the at least one rule indicative of changing at least one aspect of power consumption in the community of consuming units. The CEMS determines, based on receiving the at least one rule, one or more appliance commands for controlling power consumption to one or more appliances in the community of consuming units. The CEMS then sends the one or more commands to the community in order to modify the power consumption in the community of consuming units.

The CEMS may further monitor power supplied to the community of consuming units and determine whether a power outage is occurring based on the monitoring. The CEMS may then supply one or more of the consuming units in the community with backup power based on determining that a power outage is occurring. The CEMS may monitor power consumption on a per-unit level each of the consuming units in the community that are supplied with backup power.

Other systems, methods, features and advantages will be, or will become, apparent to one with skill in the art upon examination of the following figures and detailed description. It is intended that all such additional systems, methods, and features be included within this description, be within the scope of the disclosure, and be protected by the following claims.

DETAILED DESCRIPTION

Figure 1:
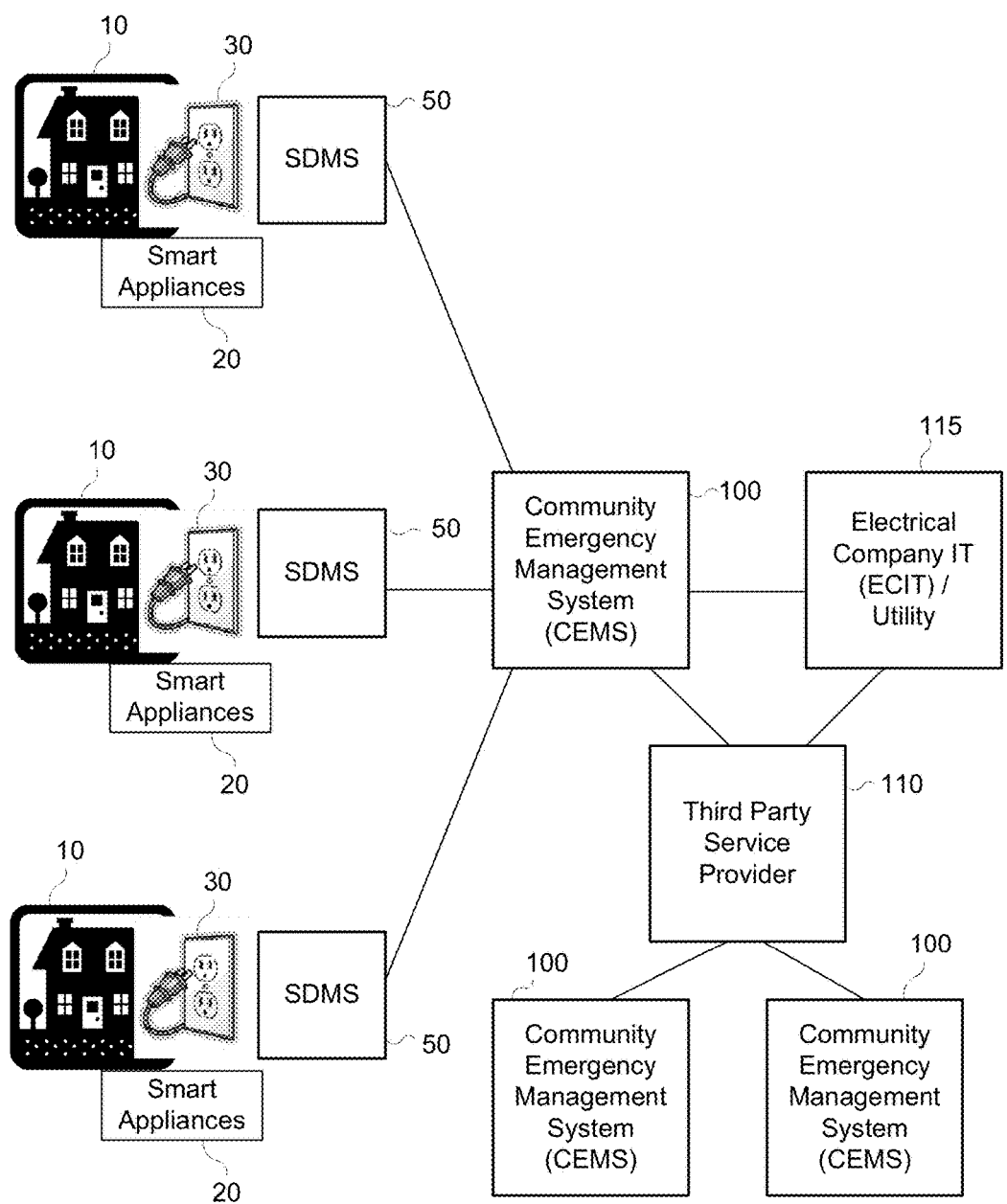
FIG. 1 is a high-level block diagram of a community energy management system (CEMS) that, in part, manages demand response in individual smart device management systems (SDMS) at respective energy-consuming units within a community, where a service provider may manage a group of CEMS.

By way of overview, the present disclosure relates generally to systems and methods for decentralized analysis and/or control of one or more communities composed of energy-consuming units that separately pay a local (or central) utility for utility bills. More specifically, an intermediary community energy management system (CEMS) is configured to analyze power consumption within and/or control power to the community. The community may be composed of one or more consuming units that consume power. The consuming units include one or more appliances and include a smart device management system (SDMS) that enables control of the one or more appliances.

As discussed in more detail below, the CEMS may analyze power consumption to the community, such as on a per-unit basis, determine backup power needs of the community, and control the appliances in the community using the SDMS. A CEMS or third party service provider may control one or more CEMSs that in turn control respective units of each community as will be explained in more detail. In this way, the CEMS or service provider may exercise control of a power grid hierarchically by controlling discrete appliances and/or managing incentives for unit owners to control discrete appliances, generally through respective SDMS of the units, but also potentially through one or more other CEMSs as well. The control and the management of the grid furthers community electricity usage goals and/or utility demand response requirements to prevent or reduce the likelihood of blackouts or brownouts.

A community may include any collection of consuming units within a power grid. For instance, communities may include residential communities, such as an apartment complex, a group of homes, or other grouping of housing units, or a business community, such as an industrial building or complex made up of discrete business units.

As some countries will not resolve their blackout and brownout issues in the near future, the present disclosure describes how communities can more fairly or more efficiently manage power consumption within a community. For instance, the disclosed systems may analyze power consumption within the community, provide and monitor backup power to units within the community when the electricity is cut as well as to its units during times of poor electricity quality (brownouts), and/or control power consumption within the community. For example, the disclosed systems can trigger activating backup generators (or other forms of stored energy such as green energy) during brownouts, and monitor backup power consumption on a per-unit basis, thus improving provision of electricity in the form of backup power to its units during these critical times. The community may monitor consumption usage at respective units by monitoring smart plugs and appliances as discussed in more detail below. The community may then charge the units a differential cost based on percentage of use, a fair cost based on actual consumption.

The CEMS is configured to gather an aggregate of electricity usage or consumption data from the units, monitor incoming supply patterns from the local utility, and then perform one or more of the following functions (among others): (i) control demand response down to appliances within the units to address blackout or brownout conditions (either on its own or as directed by the utility); (ii) estimate backup power requirements and consumption, and costs to charge individual units for backup power consumed; (iii) and manage incentives provided to owners of the units by the community and/or the local utility that encourage a reduction in electricity consumption especially during periods of high demand. The backup power may come from a generator or from some other source of energy, such as from batteries, solar panels or cells, wind mills, or other sources of green energy. The incentives may be directed by rules that include those developed by the local utility and/or rules developed by a community in furtherance of electricity consumption goals. Where local utility is referred to herein, the local utility may be the same as a central utility or may be a subpart of the central utility that serves the communities. Furthermore, the term power or energy is used interchangeably with electricity or the provision of electricity or power.

Figure 2:
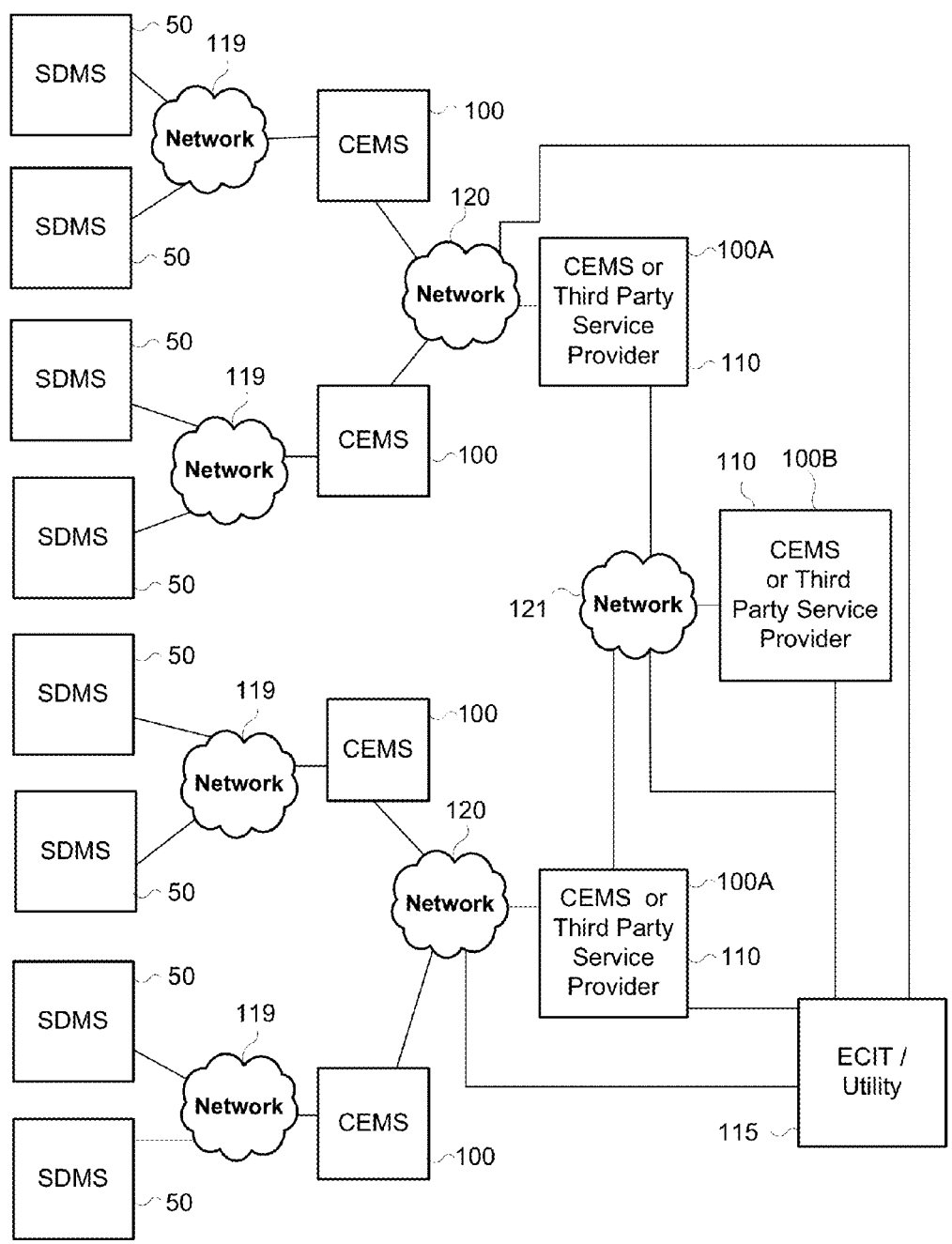
FIG. 2 is a high-level block diagram depicting the hierarchical nature of the CEMS control.

Turning to the drawings, wherein like reference numerals refer to like elements, FIGS. 1 and 2 are high-level block diagrams of a community energy management system (CEMS) 100 that, among other functions, manages demand response for a utility in individual smart device management systems (SDMS) 50 at respective energy-consuming units 10 within a community, providing a multi-tier approach to smart grid management (FIG. 2). The community is the aggregation of more than one unit, and thus more than one SDMS. The units 10 may include smart devices 20 and smart plugs 30 as previously discussed; the SDMS may aggregate consumption data and other information for an individual unit. A third party service provider 110 or other CEMs 100A, 100B may manage a group of CEMS. The CEMS aggregates consumption data and other information from multiple units 10; the service provider aggregates consumption data and other information from multiple communities.

The CEMS 100 and/or service provider 110 may perform an intermediary role in which goals and objectives executed in the form of rules may be performed on behalf of both the communities and the utility. To do so, the CEMS and service provider may receive access to the electrical company's information technology (ECIT) 115 in addition to its feeder lines, transformers and the like necessary to monitor electricity supply to respective communities. The monitoring includes parsing out periods of time during which the electricity is cut or reduced, which form incoming electricity patterns of supply. The CEMs also receive consumption data and other information from individual units 10, e.g., by way of the SDMS 50 for each respective unit, which include consumption patterns on a per-unit basis. In this way, the disclosed systems provide a decentralized, hierarchical approach to smart grid management, one where analysis and control may be pushed from the utility closer to units 10 and communities of units through use of the CEMs and SDMSs.

For instance, with further reference to FIG. 2, a CEMS 100A may control one or more other CEMS 100, which each in turn control the power consumption and manage the incentives of the community within the purview of the CEMS 100, e.g., through the SDMSs 50. One example of a CEMS 100A may be a township, municipality or city. Furthermore, a CEMS 100B may control one or more other CEMS 100A that in turn direct the control and demand response, and the like, of those CEMS 100A. One example of a CEMS 100B may be a county or region. This hierarchical pattern may continue, for instance, to state, province and country levels. When a CEMS 100 is referred to herein, it may also be with reference to the CEMS 100A or the CEMS 100B or other CEMS at further hierarchical levels.

A CEMS at a higher hierarchical level, such as CEMS 100A or 100B may perform different functions than the CEMSs 100 closest to the consuming units 10. Accordingly, the CEMSs at various hierarchical levels may together provide the sum total of the possible functions and services provided by a single CEMS 100. For instance, the CEMSs 100 may communicate with sensors at the units 10 and gather consumption data, including monitoring feeder lines and the like. The CEMSs 100 may then send all of this data on to a CEMS such as CEMS 100A or 100B that would analyze intelligently the data to make decisions, such as whether and how much to charge for consumption of backup power on a per-unit basis, or generate demand response-related commands such as to the units 10 to selectively reduce power according to a plurality of rules.

This multi-tiered approach to smart grid management provides an alternative deployment of smart energy as compared to smart meters; provides differential pricing of backup power to units (discussed below); and community-level collaboration to reduce backup power consumption.

In one embodiment, a local network 119 may be employed between the CEMSs 100 and the SDMSs 50, a network that may exist within the community that each CEMS serves. A wider area network 120 may be employed between the CEMSs 100A and the CEMSs 100 and still a wider area network 121 may be employed between the CEMSs 100B and the CEMs 100A, according to level of hierarchy and availability within respective areas or regions. In yet another embodiment, the networks 119, 120 and/or 121 may be unified in a single network. The networks 119, 120 and/or 121 may include a power line communication (PLC) network or a computer-based network based on internet or other network protocols.

Each consuming unit 10 may include one or more smart appliances 20 and one or more smart plugs 30 that communicate with a smart gateway (not shown) through the local network 119. The smart gateway may be a smart plug (or smart appliance) identical or substantially similar to the smart plug 30 previously introduced, but connected and configured such as to act as a network gateway. Alternatively, the smart gateway may be a dedicated gateway that communicates with the smart plugs 30 but does not act as a smart plug 30.

The local network 119 may be a low-powered wireless network such as IEEE 402.11 or IEEE 402.15.4 (Zigbee), a PLC network and/or an optical network. Another example of wired communication of the local network 119 may include an additional bus (such as a two-wire bus) installed along with normal electric wiring. Sometimes termed "Instabus," this two-wire bus may link all appliances to a central of customer computing devices. Thus, the additional bus may allow a centralized, rather than a decentralized communication system.

The SDMS, the CEMS and the service provider also provide various aggregations points for utility companies to tap into data that includes electricity consumption patterns at and below these hierarchical levels. Utility companies can use consumption patterns at hierarchical levels to more-intelligently develop demand response rules that address various segments of the power grid that may suffer more from lack of supply or that may require higher levels of demand response based on higher than usual growth in demand.

Similarly, communities run by the CEMS can perform a similar function where its rules may be geared toward consumption objectives of the community, including but not limited to a fair allocation of accepting electricity consumption reductions and/or deployed according to consumer preferences. By aggregating consumption data from the units 10 of the community, the CEMS 100 may analyze the data, which may be received on a per-unit basis, and generate alerts and commands to respective SDMS control systems based on incoming energy supply patterns and the per-unit consumption patterns. The CEMS may also provide a social media or other user interface for unit owners to receive usage data, consumption patterns and to track receipt of incentives (or rewards) and assessment of penalties for over usage, including over-provisioning of backup power.

To execute at least some of the functionality just discussed, intelligent (or smart) devices are used within respective units of each community from which to gather data and through which to control appliances (or devices) to execute demand response or to prompt a unit owner to adjust or turn off these appliances. Where smart appliances are not available or have not yet been deployed within certain units, smart plugs may be used. Accordingly, the functionality of the smart plugs with reference to the central or local utility will first be discussed followed by a discussion of the hierarchical management of a smart grid by the CEMS or like system. In some cases, the CEMS—or a service provider that interfaces with and controls multiple CEMS— may provide rules or other criteria with reference to electricity usage with which the CEMS may generate commands to carry out the rules and other criteria and any community-based rules or objectives. The commands may be sent directly to the smart appliances or smart plugs or may be sent to the SDMSs 50 so that the latter may coordinate and control adjustment of power to appliances.

The smart plugs and appliances enable a system and methods for reducing power demand on a power grid through demand side management by customers of a central utility of a power grid. Each CEMS accounts for customer preferences and sends one or more commands to control the customer's power consumption. In one aspect, the CEMS communicates with one or more smart plugs in order to control power consumption. In particular, one or more smart plugs may be used at the customer residences in different locations of the power grid, such as throughout the power grid. The smart plug improves control of the appliances (or devices) whose power consumption is unable to be controlled remotely, accounting for customer-assigned priorities and/or allowing the CEMS to control the appliances, thereby obviating the need to upgrade to more expensive smart appliances. In another aspect, the CEMS may communicate with one or more smart appliances, which are responsive to a command from the central utility to control its power consumption.

The term "appliance" may be used generically herein for any electrical device or machine that may affect power consumption for a power grid (such as an electrical device that consumes power and draws power from the power grid or an electrical device that generates power and contributes power to the power grid). For instance, appliances that consume power may refer to a refrigerator, oven, television, stereo, lamp, furnace and air conditioner to name just a few examples.

Sensors coupled with individual sockets of the smart plugs (or located within smart appliances) generate data regarding one or more aspects of power consumption (or usage) of one, some or each individual appliance plugged into respective sockets. For example, the sensors may generate sensor data relating to any aspect of electric power, such as the watts consumed by a respective appliance. A CEMS may send commands that control the flow of power to one, some, or all of the sockets (or smart appliances), such as to turn power on or off to the sockets (or the smart appliances) through use of relays or switches, according to assigned customer priorities or based on demand response requirements of the utility to reduce power consumption in parts of the grid. The reduction in power consumption may be selectively executed across identified parts of the grid (e.g., in one or more communities) to reduce brownout conditions and attempt to eliminate blackouts.

Furthermore, a status or category of a customer may dictate whether the customer is chosen first from which to execute load shedding or demand response. Customers may receive a discount or rebate, for instance through a power bill, for a per-unit of power saved during a time period in which an appliance is disconnected or receives less power. The system may employ sophisticated rules to determine when to disconnect power from or adjust power to certain customers and according to certain incentives.

It is believed that globally about 60% of all consumers are interested in technology that can completely automate management of electricity they use. In this way, a large segment of the population is convenience-oriented and thus prefers programs that contain "Set-And-Forget" functionality. More than one-third (about 36%) of consumers would be interested in being able to monitor and manage their usage through the latest personal electronics, such as tablet computers. And, about 32% would like to be able to measure their personal electricity usage in real time using a mobile application. The idea of a mobile application that monitors personal power consumption is especially popular in emerging markets where 60% express an interest in it, compared to just 26% in developed markets. Such monitoring is made possible through usage data received from the sensors coupled with respective sockets of the smart plugs or usage data from smart appliances.

The implications for utilities and electricity providers is that consumers will opt-in and share personal usage information when they first trust their electricity provider or manager and when the CEMS can clearly explain and alleviate concerns related to the level of control implicit in the program offer. Accordingly, when the smart plugs (and smart appliances) are purchased and used by customers, the CEMS may gather data from the smart appliances and from identified dumb appliances connected to the sockets with which to associate respective appliances with the control provided by the smart plug. This data may be gathered at the SMDS level as will be discussed.

In summary, it is believed that an energy demand response solution may succeed where, among other things: (1) appliances that can be turned off in the home are decided by the customer; (2) CEMs with permission from consumers who have signed up for the demand management programs ("opt-in") can turn off appliances in customer residences during peak load time based on choice of each customer; and (3) customers participate in demand management in return for a decrease in their electricity bills and/or loyalty rewards from the CEMs. The disclosed smart plug allows a CEMS to successfully implement a demand response system as discussed in more detail below. The CEMS and SDMS may provide a hierarchical management solution that customizes rules specific to a unit or to a community of customers in a decentralized way that removes a level of control from the utility.

Figure 3:
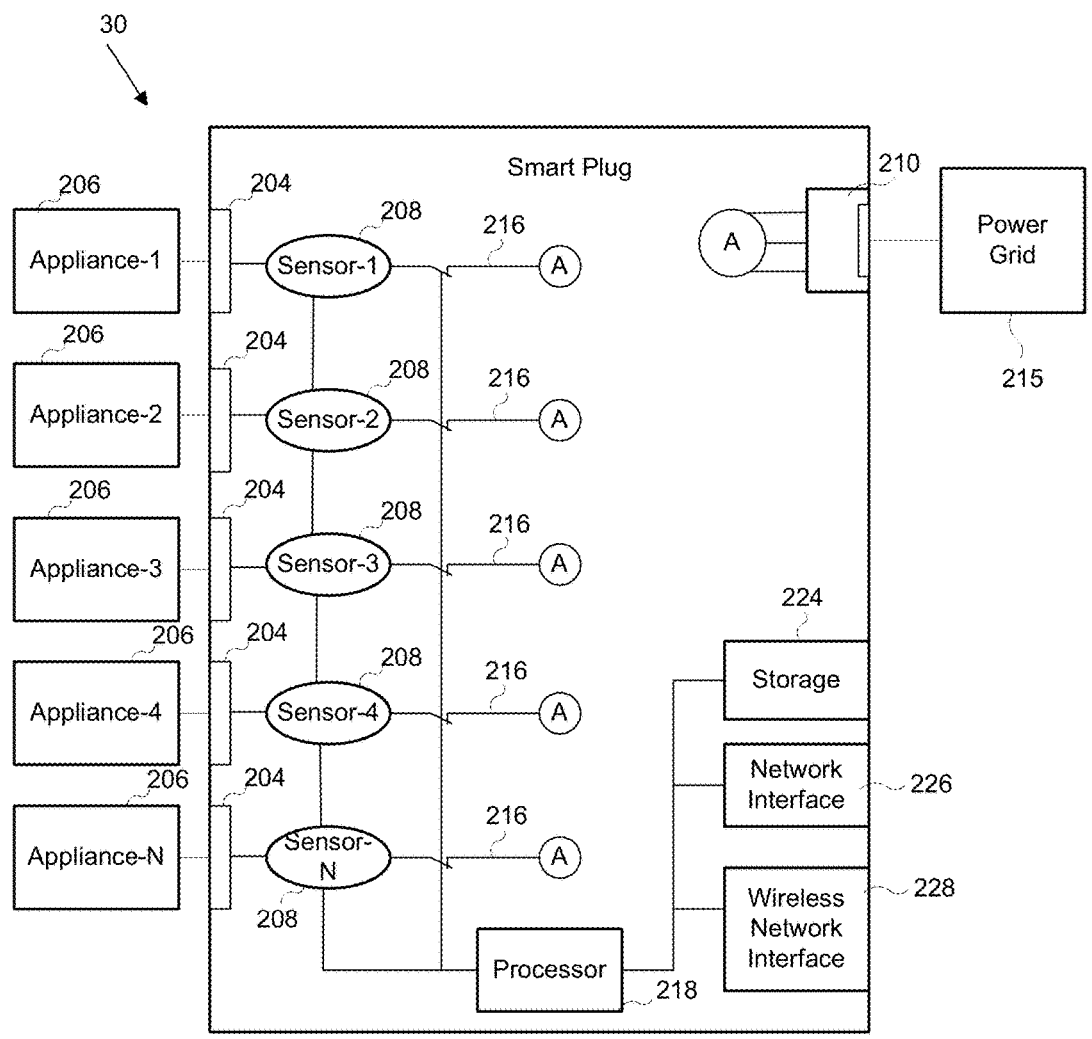
FIG. 3 is a circuit diagram of one configuration of a smart plug according to the present disclosure.

FIG. 3 illustrates a circuit diagram of one configuration of a smart plug 30 according to the present disclosure. The smart plug 30 may be programmably controllable in order to remotely detect, monitor, calculate and control energy consumption of electrical devices/appliances connected to the smart plug 30. As previously indicated, a smart appliance 20 may be used in conjunction with (or instead of) the smart plugs 30 to provide intelligence and control capabilities to the CEMs. Accordingly, a smart appliance may include the same components as the smart plugs 30 with the only exception being the absence of sockets because the smart appliance may be connected directly to the power grid through conventional power sockets of a customer residence.

The smart plug 30 includes one or more sockets 204 into which are connected corresponding appliances 206. Each socket 204 is electrically coupled with a corresponding sensor 208. The term "coupled with" is defined herein as directly or indirectly connected to a component, optionally through one or more intermediate components, with the coupling allowing the flow of power through the socket to the respective appliance. The smart plug 30 includes a power connector 210 for connecting to a power grid 215. The power connector 210 may supply the power or energy from the smart grid to respective sockets 204. Electronic circuitry may be disposed between the sockets 204 and the power connector 210. Examples of electronic circuitry include one or more switches or relays (or other actuator) 216.

A processor 218 is configured to receive data from the sensors 208, to receive commands from a CEMS, and control the switches or relays 216 according to the commands received from the CEMS. The command received may be from a central controller or a distributed controller of the CEMS. The sensors may provide, in addition to usage information, additional information about an environment in which the smart plug resides, for instance one or more of: movement, levels of light, temperature and inactivity of an appliance. This additional data may also be sent to the central utility, which may be used in isolation or combined with priorities assigned to appliances by customers to decide which appliances to shut off first.

The smart plug 30 may include computer storage 224 (or memory for storage of sensor data or the like), a network interface 226 and/or a wireless network interface 228 coupled with and controllable by the processor 218. Communication through the network interface 226 may be by Ethernet, fiber or any other type of wired connection to a network, including but not limited to a wide area or local area network, or the Internet. This wired communication may also include Power Line Communication Systems (PLC) in which a modulated carrier signal is impressed on the customer premises wiring system. In particular, PLC may be used to send coded signals along a home or building's existing electric wiring to programmable smart plugs 30. These signals convey commands that correspond to "addresses" or locations of specific appliances based on respective sensor identities, and that control how and when those appliances operate.

Communication though the wireless network interface 228 may be according to any sort of known wireless standard, such as IEEE 402.11, IEEE 402.15.4-2003 (Zigbee), Bluetooth or WiFi. The Zigbee standard, for instance, allows intercommunication of low-power wireless devices such as the smart plugs 30 that may intercommunicate in a way that passes data on from other smart plugs(s) 30. While the wireless network interface 228 may be intended for low-power communication of data from the sensors 208, the wireless network interface 228 may also support higher power communication for instance with cellular towers (FIG. 4) that may facilitate communication directly with the central utility.

The processor 218 sends data read from each respective sensor 208 to the SDMS 50 and/or CEMS 100. The sensors 208 measure voltage and current consumed by appliances (or devices) 206 connected to respective sockets 204. The processor 218 may further calculate consumed power or a power factor of the respective appliances, or this analysis may be performed at the CEMS 100 as will be discussed. Accordingly, data sent to the SDMS and/or CEMS may include consumed voltage, current and/or power from each respective appliance identified by way of sensors connected to respective sockets.

The processor 218 may further receive commands from the CEMS to disconnect or adjust power to one or more of the sockets 208, to thus turn off the appliances (or devices) 206 connected to respective sockets. The processor 218 turns off or adjusts power to the one or more sockets 208 by opening one or more of the switches or relays 216 (or triggering an actuator). Likewise, the commands, when executed, may reconnect power to respective sockets, thus turning appliances back on that are connected to the respective sockets by closing the switches or relays 216 or toggling an actuator. These commands may be sent wirelessly or by wired communication as discussed.

Figure 4:
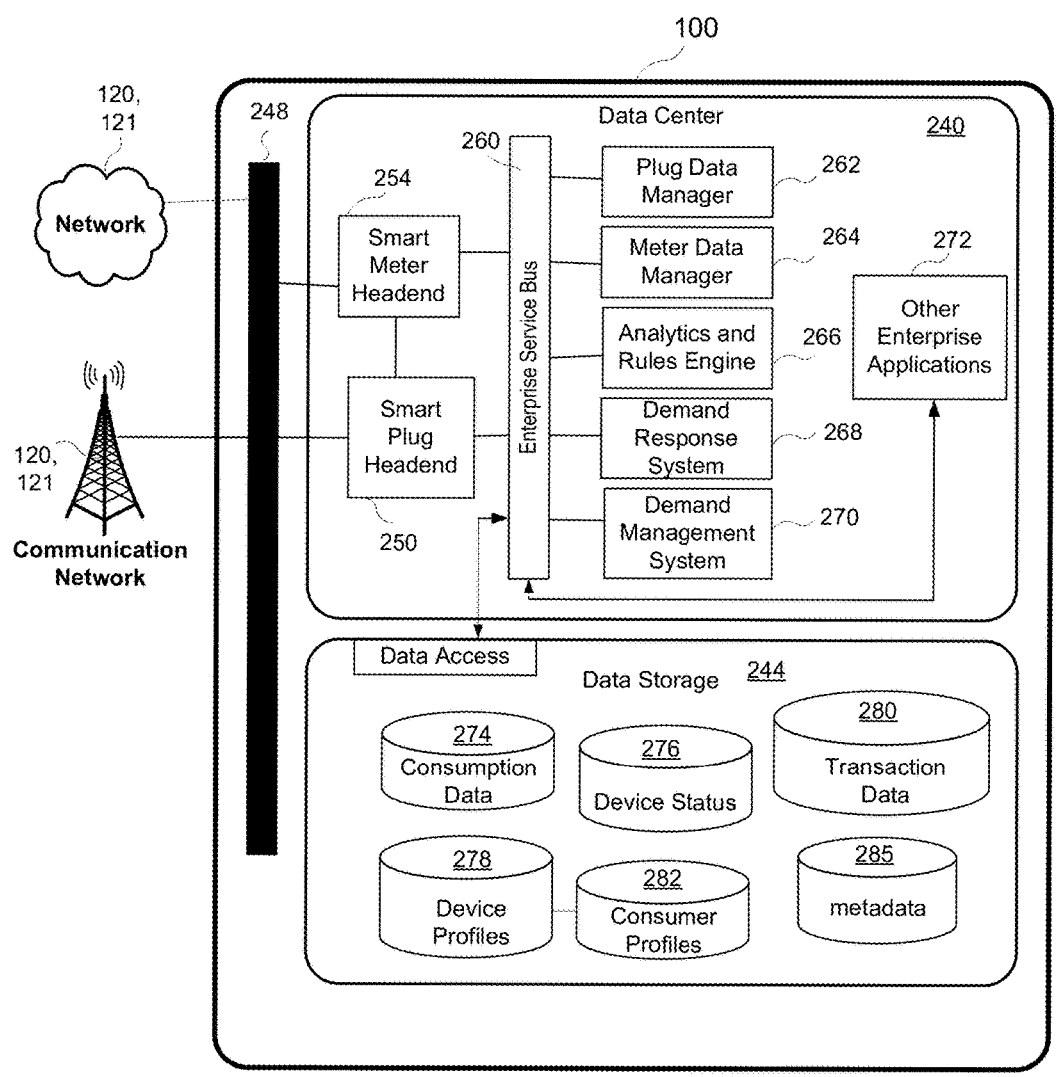
FIG. 4 is a detailed block diagram of an embodiment of the CEMS of FIGS. 1-2.

FIG. 4 illustrates an embodiment of a community energy management system (CEMS) 100. The CEMS 100 may communicate over a computer network and/or a communication network, either 120 or 121 from FIG. 2. The computer network may include a wide area network (WAN), a local area network (LAN), an intranet or the Internet or World Wide Web. The communication network may be a network provided by a utility and can include PLC capability through the power grid 215, a cellular network or a combination thereof. Often, the communication network is provided by the cellular operators, which could be third party providers. In one embodiment, the communication network may be combined with the computer network and accessible to the Internet.

Communication and control of the smart appliances 20 and the smart plugs 30, therefore, is typically directly with a central utility. The present disclosure proposes to move that communication and control to the SDMS 50 and/or the CEMS 100, and thus to be handled at a closer location to the appliances being monitored and controlled. Reference to smart appliances 20 may be left out of parts of the present disclosure for simplicity; however, smart appliances 20 may be considered by the SDMS 50 and/or CEMS 100 in addition to dumb appliances 206 plugged into sockets of the smart plugs 30.

The data center 240 of the CEMS 100 may further include a smart plug headend 250 for communicating through the networks 120 or 121 with the smart gateway discussed previously. The data center may further include a smart meter headend 254 for communicating through the networks 120 and 121 with any smart meters, smart appliances or smart plugs that may be present in a customer unit 10. The smart plug headend 250 and the smart meter headend 254 may communicate with the networks 120 and 121 through a common set of data security services 248. The data security services 248 may provide security in the form of a firewall and through virus, spam and malware filtration types of services.

The data center 240 further includes an enterprise service bus 260 for the intercommunication of the components of the data center 240 with the smart meter headend 254 and the smart plug headend 250. The data center 240 may provide data from the sensors of the smart plugs 30 through the enterprise service bus 260 for presentation to the customers in a Web interface or Web application in the display of one or more customer computing devices (not shown).

A number of processors or modules may be coupled with the enterprise services bus 160, including but not limited to, a plug data manager 262, a meter data manager 264, an analytics and rules engine 266, a demand response system 268, a demand management system 270 and other enterprise applications 272 as may be necessary for the monitoring and control of components of the power grid 215.

The data storage 244 may be stored on a server or in a distributed fashion across the computer network and/or the communication network of either 120 or 121. The data storage 244 may include, but not be limited to, power consumption data 274, device statuses 276, device profiles 278, transaction data 280, consumer profiles 282 and metadata 285 related to the data stored in the data storage 244. This data, as categorized, may relate at least to power utilization and usage history related to respective units 210, and profiles built from such data or transactions conducted by customers within the units. This history and these transactions may include customer choices of priorities assigned to identified devices or appliances. For instance, a database for the device profiles 278 may save a history of priorities assigned to specific appliances over time and may also record historical electricity consumption data by specific appliances.

The plug data manager 262 is configured to receive and manage data from the smart plugs 30, e.g., by storing it in the correct databases of the data storage 244 and sending the data in the correct format to the analytics and rules engine 266 or to other enterprise applications 272. The meter data manager 264 may receive and manage data from the smart meters 230. The analytics and rules engine 266 may analyze data from the power grid 215 and from respective units 10 and decide when power usage will be greater than available supply, or to act on rules or consumption quotas provided by the utility 115. The analytics and rules engine 266 may then select a customer home from which to adjust or disconnect power and from which of one or more appliances at the selected home, to reduce the demand sufficiently so that it is not greater than the supply, or to otherwise carry out the rules and quotas of the utility.

The demand response system 268 may then send commands according to the determinations made by the analytics and rules engine 266 indicative of which appliances/devices are to be disconnected or adjusted and at which units. The processors 218 of the smart plugs 30 into which respective appliances are connected may activate or deactivate the relay or switch 216 connected to the socket 204 into which the respective appliances that are to be controlled are connected. In this way, the smart plugs 30 may adjust or disconnect power to the appliances specified in the commands of the demand response system 268 in which the CEMS 100 seeks to meet a reduction in power demand that before was handled with rolling blackouts. Similar commands may then be sent by the demand response system 268 to restore power to specified appliances in specified units when a surplus of power is made available within the power grid. Such a surplus of power may be created by less natural demand on the power grid, such as due to weather changes, or because the analytics and rules engine 266 has determined that it is the turn of other customer(s) and/or appliance(s) to be disconnected or power thereto adjusted based on the current set of priorities and rules.

The customers may assign, through the customer portal 244, priorities for one more appliances or in-home devices. The meaning of different levels of priorities is flexible, and may change depending on a time of day or a day of week or some other temporal factor. By providing the SDMS 50 and/or CEMS 100 with priorities of respective appliances, the customer of a unit indicates a preferred sequence for disconnection of, or adjustment of power to, the appliances of the customer from the power grid. The result is that the demand response system 268 may send commands to disconnect or adjust appliances in a prescribed order as preferred by the customer, leaving a level of control with the customer in regards to which appliances lose power. Some customers may also be willing to pay a surcharge to be considered a more preferred customer and thus receive fewer commands to have appliances lose power.

The following are a number of exemplary algorithms and rules that may govern the analytics and rules engine 266, the demand response system 268 and the demand management system 270 in the intelligence that drives demand response to control demand on the power grid when demand is greater than available supply. As will be discussed later, the demand response and commands may also be driven by community objectives, community rules, consumption quotas set by contract with a central utility and other rules or criteria provided by the central utility.

Assumptions and Notations

N units: 1, 2, . . . , N

Rebate for Unit i: $Rebate_i$

Unit i has M appliances: $A_{i,1}, A_{i,2}, \ldots, A_{i,M}$

Power (Wattage) of Appliance j in Unit i is denoted by: $W_{i,j}$

Preference/Priority of Appliance j in Unit i is denoted by: $P_{i,j}$

One (1) is lowest priority (should be turned off or adjusted first) and M is the highest priority.

Supply: S

Demand: D

Gap G=D−S

Algorithm 1

Choose a random number R between 1 and N, thus choosing a customer unit randomly. While the algorithms below state random choice as a first choice, there are alternatives to randomly choosing the number R for a customer. For instance, the CEMS may always start with the same customer, but give that customer a $50/month (or higher) rebate. As an alternative, the CEMS may always start with the unit next to the last unit to receive a power cut and progress to units that have gone the longest without having power levels to appliances adjusted or disconnected. As a further alternative, the CEMS may start with the unit that has consumed the power in a neighborhood over the last month. The other algorithms below may be similarly modified.

```
Unit = R;
For (k=1; k<=M; k++)
  For (i = 1; i<=N; i++)
    If G > 0 then
      Pick A_{Unit, j} such that P_{Unit, j} = k and turn it off or adjust;
      Rebate_{Unit} = Rebate_{Unit} + Per_Unit_Incentive * W_{Unit, j};
      G = G − W_{Unit, j};
      Unit = (R+1) mod N ;
  Endfor
Endfor
```

Algorithm 1 therefore provides a rebate for participating as well as a per-unit (wattage) incentive for saved power for each customer unit that participates in the demand reduction executed by the CEMS. The rebate and/or the per-unit incentive may be applied to a bill or by way of a deposit into a bank account or a check sent in the mail.

Now, assume there are two categories of appliances such as (1) basic and (2) luxury. Unit i has $M_{i,1}$ luxury appliances: $L_{i,1}, L_{i,2}, \ldots, L_{i,M_{i,1}}$ and $M_{i,2}$ basic appliances: $B_{i,1}, B_{i,2}, \ldots, B_{i,M_{i,2}}$. These two categories are just examples, and could be expanded to include a spectrum of categories tied to levels of need, for instance: Critical+, Critical, Basic+, Basic, Comfort+, Comfort, Luxury+, and Luxury. For instance, the CEMS may assign categories to appliances according to this spectrum:

Critical: Medical devices (Heart Rate monitor, ECG etc.);

Critical+: Critical plus Ventilation system etc.

Basic: Lights+TV;

Basic+: Basic plus Fans;

Comfort: Basic plus Heater, Refrigerator, Microwave, Washing Machine, and/or Dishwasher;

Comfort+: Comfort plus AC and Home Theater system;

Luxury: Comfort plus Jacuzzi, etc.;

Luxury+: Luxury plus Home Automation System etc.;

The preference of critical or basic appliances is higher while that of luxury appliances is lower. Preference of Basic appliance j in Unit i is denoted by $PB_{i,j}$ while Preference of Luxury appliance j in Unit i is denoted by $PL_{i,j}$. The CEMS may assign a critical or critical+ category to certain life-saving or medical-related appliances as a threshold category to make sure they are highly prioritized and always powered at normal levels by the power grid, absent a natural disaster.

One (1) is the lowest priority (should be turned off or adjusted first); and $M_{i,1}$ is the highest priority of luxury appliances while $M_{i,2}$ is the highest priority of basic appliances.

Algorithm 2

```
Choose a random number R1 between 1 and N, thus choosing a
customer's unit randomly.
  Unit = R1;
  For (k=1; k<=M_{Unit,1}; k++)
    For (i = 1; i<=N; i++)
      If G > 0 then
        Pick A_{Unit, j} such that PL_{Unit, j} = k and turn it off or
adjust;
        Rebate_{Unit} = Rebate_{Unit} + Per_Unit_Incentive_L * W_{Unit, j};
        G = G − W_{Unit, j};
        Unit = (R1+1) mod N ;
    Endfor
  Endfor
  /* Repeat with basic appliances that have different per unit
incentive */
  Choose a random number R2 between 1 and N.
  Unit = R2;
  For (k=1; k<=M_{Unit,2}; k++)
    For (i = 1; i<=N; i++)
      If G > 0 then
        Pick A_{Unit, j} such that PB_{Unit, j} = k and turn it off or
adjust;
        Rebate_{Unit} = Rebate_{Unit} + Per_Unit_Incentive_B * W_{Unit, j};
        G = G − W_{Unit, j};
        Unit = (R2+1) mod N ;
    Endfor
  Endfor
```

Now, assume there are two categories of customers: premier (or more-preferred) and non-premier (or less-preferred). Also assume that Customer Category of Unit i is denoted by $CC_i$ and $CC_i=P$ for Premier customers and $CC_i=NP$ for Non-Premier customers.

While for purposes of Algorithm 3 (below) the two categories makes the example easier to follow, the CEMS 100 may use any number of categories, which themselves may be determined by an amount the customer is willing to pay per unit of energy consumption. For instance, the categories of customers may include, but not be limited to: diamond; platinum; gold; silver; and bronze where the bronze and silver customers have appliances disconnected before the diamond and platinum customers. Customers may therefore be categorized as follows in one example in terms of what surcharge the customers are willing to pay:

Bronze: 5 cents/KWH

Silver: 10 cents/KWH

Gold: 20 cents/KWH

Platinum: 35 cents/KWH

Diamond: 50 cents/KWH

Categorizing customers in this way may be executed as a monetary exchange or bidding system in which customers who outbid other customers may receive a more-preferred status.

Algorithm 3

```
Choose a random number R1 between 1 and N.
Unit = R1;
For (k=1; k<=M_{Unit,1}; k++)
  For (i = 1; i<=N; i++)
    If G > 0 then
      If CC_{Unit} = NP then
      Pick A_{Unit, j} such that PL_{Unit, j} = k and turn it off or
        Rebate_{Unit} = Rebate_{Unit} + Per_Unit_Incentive_LNP *
        G = G - W_{Unit, j};
        Unit = (R1+1) mod N ;
    Endfor
  Endfor
/* Repeat with luxury appliances of premier/preferred customers
who have different per unit incentive */
  Choose a random number R1 between 1 and N.
  Unit = R1;
  For (k=1; k<=M_{Unit,1}; k++)
    For (i = 1; i<=N; i++)
      If G > 0 then
        If CC_{Unit} = P then
        Pick A_{Unit, j} such that PL_{Unit, j} = k and turn it off or
adjust;
          Rebate_{Unit} = Rebate_{Unit} + Per_Unit_Incentive_LP *
W_{Unit, j};
          G = G - W_{Unit, j};
          Unit = (R1+1) mod N ;
      Endfor
    Endfor
  Choose a random number R2 between 1 and N.
  Unit = R2;
  For (k=1; k<=M_{Unit,2}; k++)
    For (i = 1; i<=N; i++)
      If G > 0 then
        If CC_{Unit} = NP then
        Pick A_{Unit, j} such that PB_{Unit, j} = k and turn it off or
adjust;
          Rebate_{Unit} = Rebate_{Unit} + Per_Unit_Incentive_BNP *
W_{Unit, j};
          G = G - W_{Unit, j};
          Unit = (R2+1) mod N ;
      Endfor
    Endfor
/* Repeat with basic appliances of premier/preferred customers who
have different per unit incentive */
  Choose a random number R2 between 1 and N.
  Unit = R2;
  For (k=1; k<=M_{Unit,2}; k++)
    For (i = 1; i<=N; i++)
      If G > 0 then
        If CC_{Unit} = P then
        Pick A_{Unit, j} such that PB_{Unit, j} = k and turn it off or
adjust;
          Rebate_{Unit} = Rebate_{Unit} + Per_Unit_Incentive_BP *
W_{Unit, j};
          G = G - W_{Unit, j};
          Unit = (R2+1) mod N ;
      Endfor
    Endfor
```

Now, assume every unit has a different willingness to pay for basic and luxury appliances and the units are sorted such that Unit 1 has the lowest willingness to pay while unit N has the highest willing to pay. In addition, the per-unit incentive is also different for each unit.

Algorithm 4

```
Unit = 1;
For (k=1; k<=M_{Unit,1}; k++)
  For (i = 1; i<=N; i++)
    If G > 0 then
      Pick A_{Unit, j} such that PL_{Unit, j} = k and turn it off or
        Rebate_{Unit} = Rebate_{Unit} + Per_Unit_Incentive_L_i * W_{Unit, j};
        G = G - W_{Unit, j};
        Unit++ ;
  Endfor
Endfor
/* Repeat with basic appliances that have different per unit incentive
for each unit */
  Unit = 1;
  For (k=1; k<=M_{Unit,2}; k++)
    For (i = 1; i<=N; i++)
      If G > 0 then
        Pick A_{Unit, j} such that PB_{Unit, j} = k and turn it off or
adjust;
          Rebate_{Unit} = Rebate_{Unit} + Per_Unit_Incentive_B_i * W_{Unit, j};
          G = G - W_{Unit, j};
          Unit++ ;
      Endfor
    Endfor
```

Smart plug installation is consumer driven based on an expectation that consumers more likely to afford smart plugs as compared to smart appliances. Accordingly, smart plugs may be more widely adopted in areas of the world where it is expensive or out of reach for most consumers to buy smart appliances or devices. Furthermore, consumers may be motivated by government, utilities, non-government organization and the like to adopt smart plug technology to move forward the developments disclosed herein.

Especially closed communities like residential complexes and even industrial parks with small scale, cottage industries will benefit from smart plug usage. While each individual unit such as a residence or industrial unit benefits from smart monitoring and control of its electricity consumption, as a group these units can cooperate to manage the community energy needs for overall benefits and present to the utilities and government a right-sized unit and associated procedures for providing incentives. The disclosed smart plug solutions are individual unit centric and can offer an extension to known smart grid capabilities.

Figure 5:
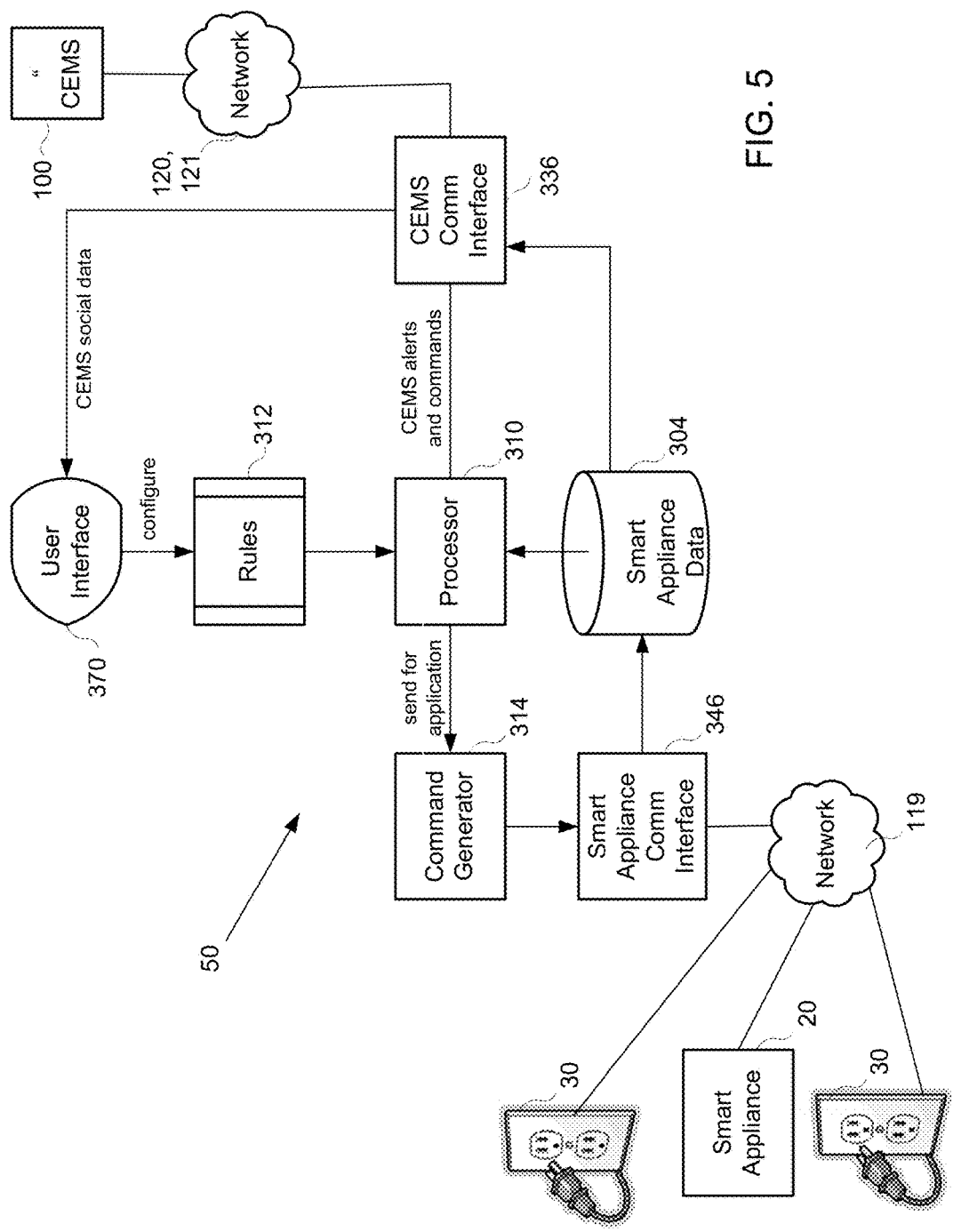
FIG. 5 is a block diagram of an exemplary SDMS that interfaces with the CEMS of FIGS. 1-2 and 4 and with smart devices and smart plugs within a unit.

FIG. 5 is a block diagram of an exemplary SDMS 50 that interfaces with the CEMS 100 of FIGS. 1-2 and with smart devices 20 and smart plugs 30 within a unit 10. The SDMS 50 may include, but not be limited to, a smart appliances database 304, a processor 310, rules 312 stored in memory, a command generator 314, a CEMS communication interface 336 and a smart appliance communication interface 346.

The CEMS communication interface 336 may communicate over the network 120 or 121 with the CEMS 100 (FIG. 8), through which are received alerts and commands based on incoming energy supply patterns and the per-unit consumption patterns among other data. The CEMS communication interface 336 may also send, for display in the user interface 370, the alerts, social data, consumption data, statistics related to consumption rates, and information related to incentives and penalties as received from the CEMS (or service provider). The CEMS communication interface 336 may also send consumption data to the CEMS 100 that has been aggregated from the smart appliances and plugs and stored in the smart appliance/plug database 304.

Customer or unit owners may configure the rules 312, which may include the priorities and preferences discussed above, through the user interface 370, which may be accessible in the display of customer computing devices. The processor 310 may execute the rules, display the alerts and pass on the commands from the CEMS, with or without modification. The command generator 314 may generate or pass on commands appropriate for execution by the smart appliances 20 and/or smart plugs 30 after passage through the smart appliance communication interface 346 and the local network 119. The details of different rules will be discussed with reference to FIGS. 6-16.

Figure 6:
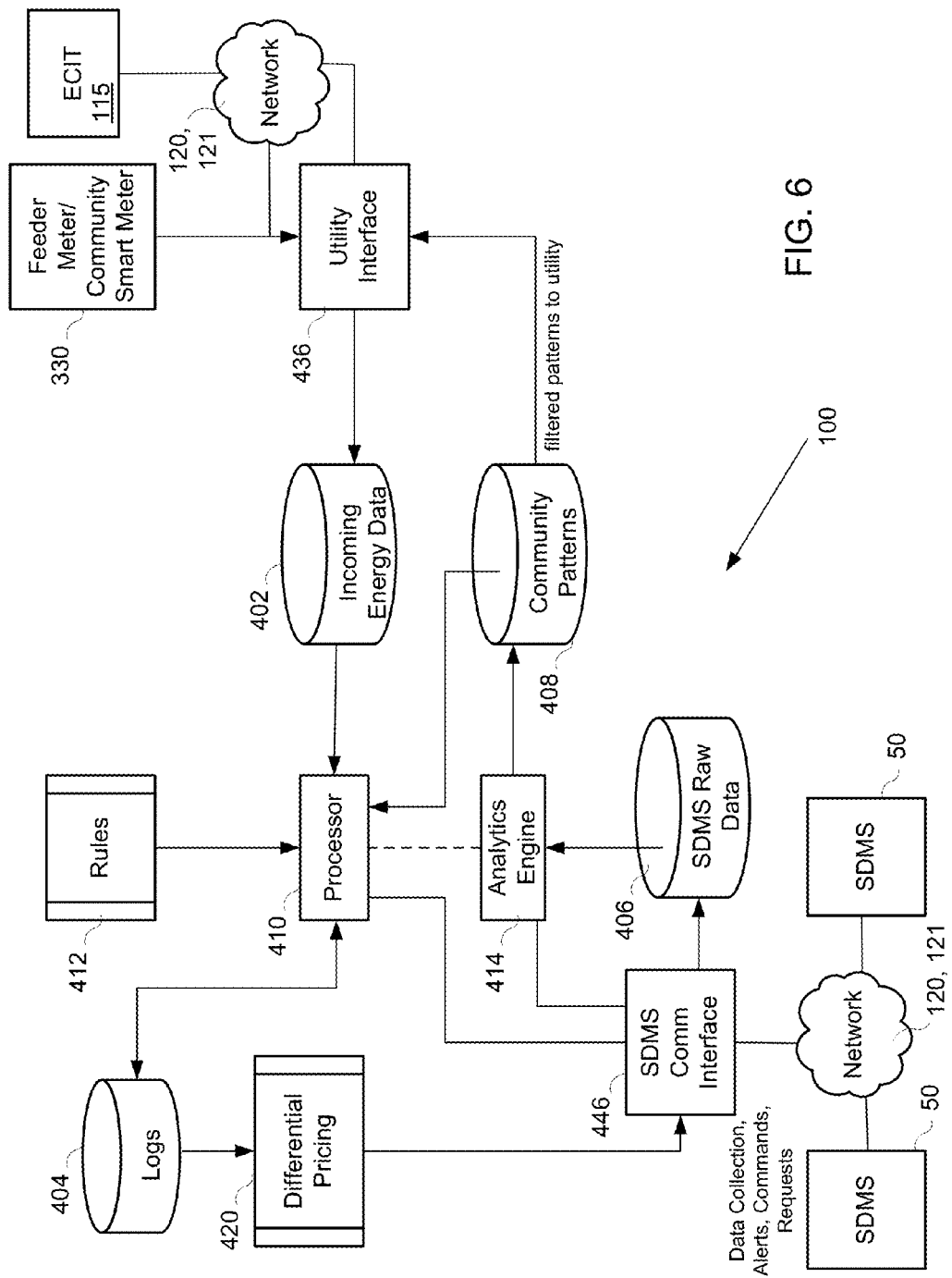
FIG. 6 is a block diagram of another or additional embodiment the CEMS depicted in FIGS. 1-2 and 4.

FIG. 6 is a detailed block diagram of another or additional embodiment the CEMS 100 depicted in FIGS. 1-2 and 4. Each CEMS 100 may include, but not be limited to: an incoming energy database 402, a logs database 404, an SDMS raw data database 406, a community patterns database 408, a processor 410, an analytics engine 414 that may integrated with the processor 410, rules 412 stored in memory, a set of differential pricing criteria or rules 420, a feeder meter 330 and/or community smart meter 330, a utility interface 436 and an SDMS communication interface 446.

The feeder meter (or community smart meter) 330 may communicate directly with the utility interface 436 or via the network 120 or 121. The utility interface 436 may thus monitor electricity provided via a utility feeder line to the community. The utility interface may also communicate with the utility information technology (ECIT) infrastructure, and thus be able to send to the ECIT community consumption patterns, which may be provided on a per-unit basis. Incoming energy (or electricity) patterns from the utility may be stored in the database 402, which may include tracking periods of time during which electricity was reduced or cut, creating brownouts and/or blackouts.

The SDMS communication interface 446 may communicate with the smart device management systems (SDMSs) 50 that are located at individual units 10 to collect consumption data from the SDMS for the units, and to send alerts, commands and requests to the SDMS for execution with respect to appliances at respective units of the community. The SDMS communication interface 446 may also collect and store in the SDMS raw data database 406 the consumption data and other information of the units corresponding to respective SDMS's. The analytics engine 414 (discussed more in FIG. 7) may analyze the raw data to develop electricity consumption patterns, and aggregate such patterns at the community level for storage in database 408. The analytics engine may also filter the unit consumption data to find amounts and duration of power consumption by respective units during the time periods the electricity from the local utility is cut. This power consumption is said to correspond to provisioned backup power.

The community may develop the rules 412 that may be stored in memory or other computer storage for access by the processor 410. Logs may be stored in logs database 404 related to pricing of provisioned backup power based on time periods of reduced power or cut power from the utility. The differential pricing criteria 420 may then be applied so that different units are charged differently based on a percentage of consumption of the backup power in relation to total backup power consumed by the community (or other criteria).

Figure 7:
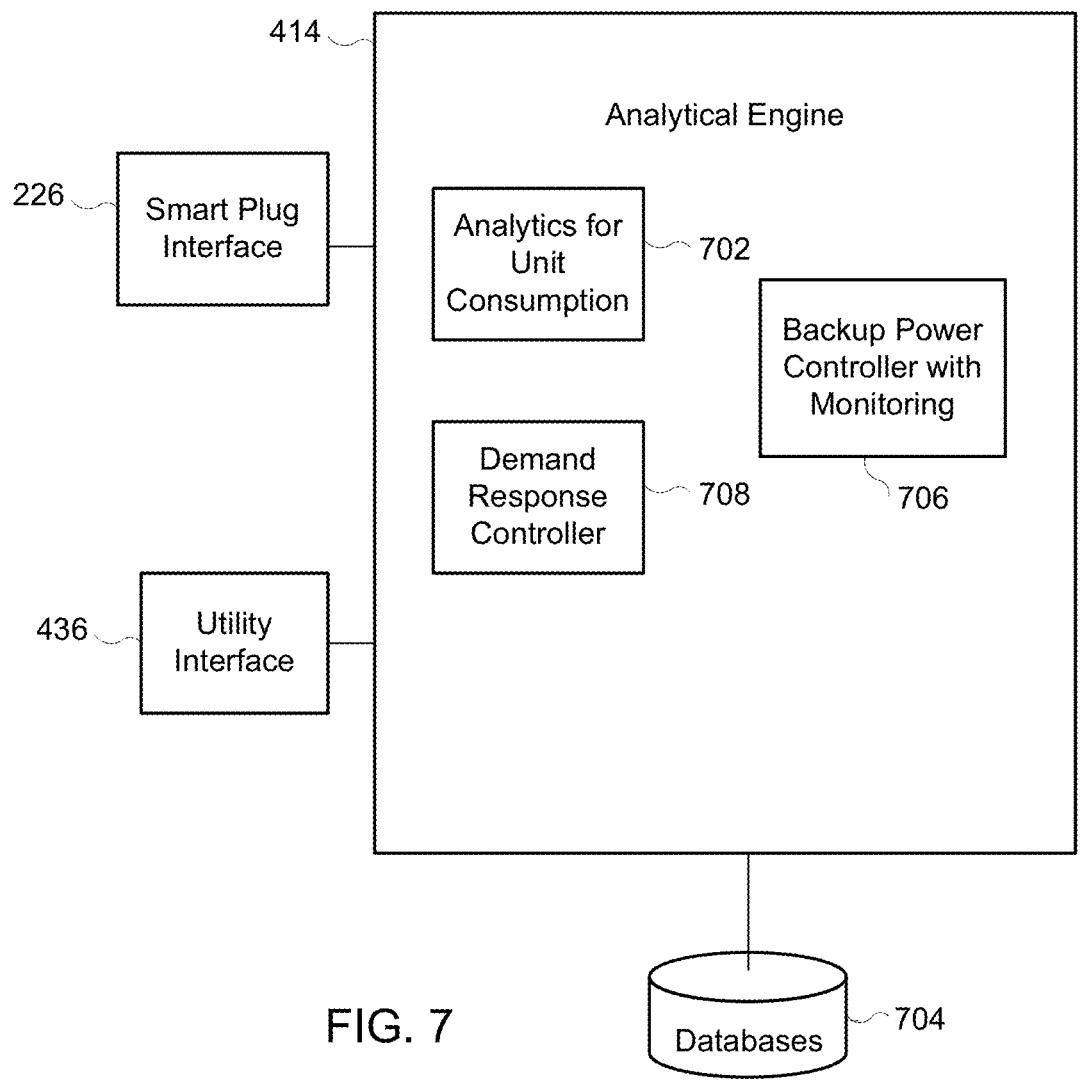
FIG. 7 is a block diagram of an embodiment of the analytical engine shown in FIG. 6.

FIG. 7 is a block diagram of an embodiment of the analytical engine 414 shown in FIG. 6. The analytical engine 414 may be coupled with the smart plug interface 226 and the utility interface 436. The analytical engine 414 may include, but not be limited to, an analytics unit for consumption 702, a demand response controller 708, and a backup power controller with monitoring 706. The analytical engine 414 may further include one or more databases 704 such as those discussed with reference to FIG. 6.

Figure 8:
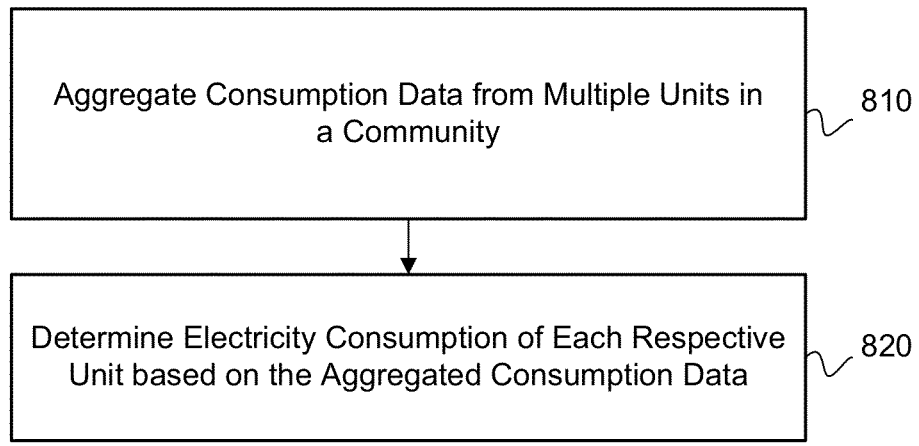
FIG. 8 is a flow chart of a method for determining unit-level consumption of electricity based on aggregate consumption from a community.

The analytics for unit consumption 702 may aggregate consumption information from the units 10 and determine how much electricity is consumed on a per-unit basis (FIG. 8). The analytics for unit consumption 702 may also provide per-unit consumption data to the utility. The demand response controller 308 may execute demand response on behalf of the community or the utility, and examples of such demand response are discussed with reference to at least FIGS. 11-12.

The backup power controller with monitoring 706 may monitor and record consumed amounts of backup power by individual units during brownout or blackout periods, e.g., by receiving consumption data from respective SDMS's of the units. The backup power controller 706 may also sense degradation (or brownout) conditions or a cut in electricity (blackout) and turn on the correct power generators to meet the required amount of electricity. When the disclosed system provides backup power during brownout conditions, it may be referred to as providing "supplemental" power.

FIG. 8 is a flow chart of a method for determining unit-level consumption of electricity based on aggregate consumption from a community. At block 810, the disclosed system aggregates consumption data from multiple units in a community. At block 820, the system determines electricity consumption of each respective unit based on the aggregated consumption data.

Figure 9:
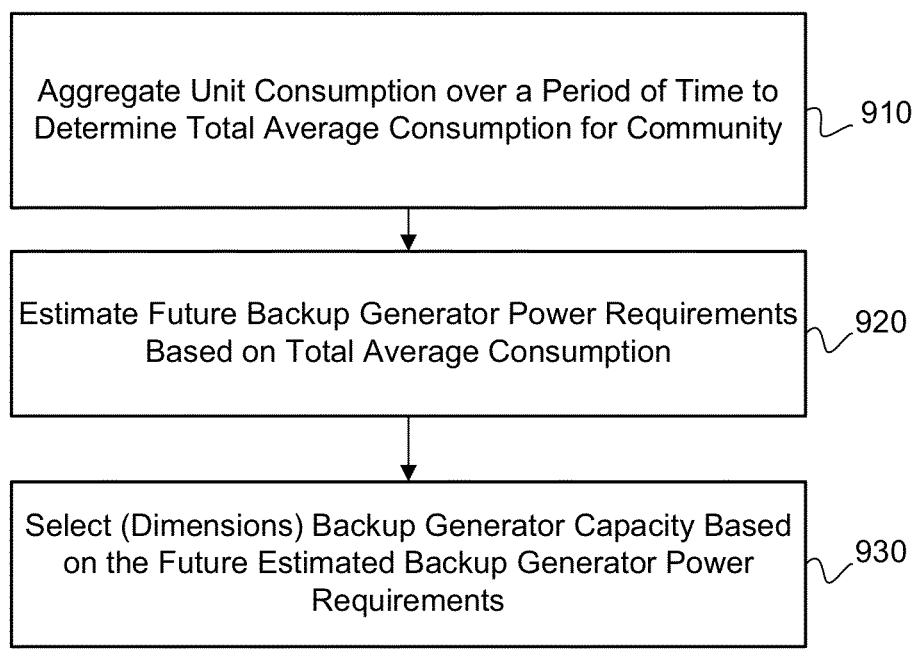
FIG. 9 is a flow chart of a method for selection of backup generator capacity based on total average consumption for a community.

FIG. 9 describes steps of a method for selection of backup generator (or backup power) capacity based on total average consumption for a community. This method provides a "long term" estimation used for dimensioning properly backup power generators at a community. At block 910, the disclosed system aggregates unit consumption data over a period of time to determine total average electricity consumption for a community. At block 920, the system estimates future backup power requirement, based on total average consumption. At block 930, the system selects (or dimensions) backup generation capacity based on the future estimated backup power requirements so the community will be prepared with sufficient backup generation capacity in the event of brownouts or blackouts.

Figure 10:
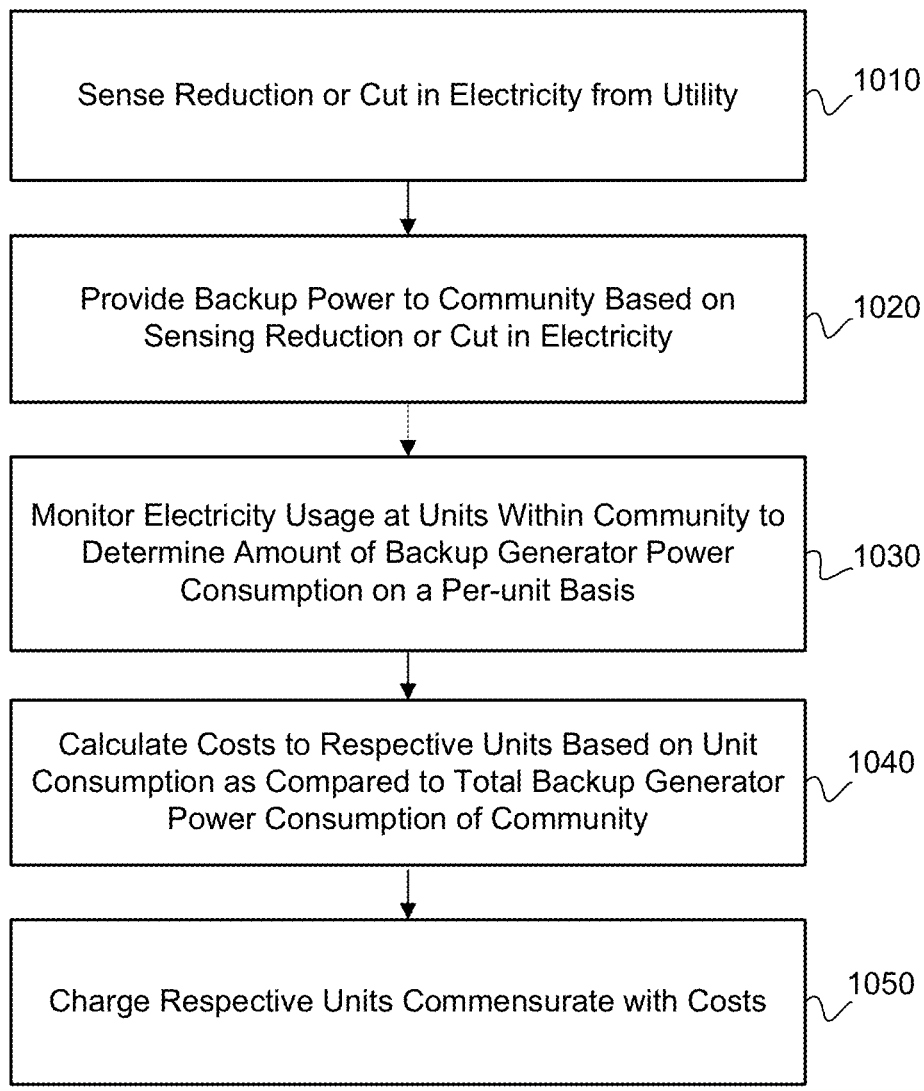
FIG. 10 is a flow chart of a method for providing backup power based on sensing a reduction or cut in electricity to a community.

The process of FIG. 9 is fairly straight-forward, but it is more difficult to provide "dynamic" calculation of backup power consumption on a per-unit basis within the community during a brownout or a blackout. The disclosed system provides this capability as disclosed with reference to at least FIGS. 5-7 and 10. FIG. 10 discloses steps of a method for providing backup power based on sensing a reduction or cut in electricity to a community. At block 1010, a disclosed system senses a reduction or cut in electricity from the local utility. At block 1020, the system provides backup power to the community based on sensing the reduction or cut in electricity. At block 1030, the system monitors electricity usage at the units, e.g., via the SDMSs, and determines the amount of backup power consumption on a per-unit basis. At block 1040, the system calculates costs to respective units based on per-unit consumption as compared to total backup power consumption by the community. At block 1050, the system charges respective units commensurate with the costs on a per-unit basis.

Figure 11:
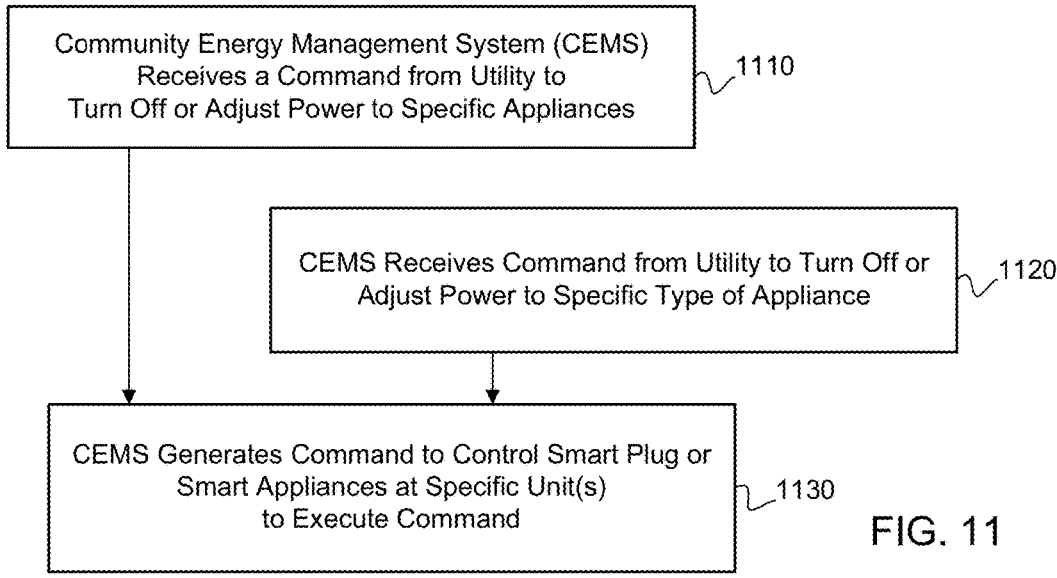
FIG. 11 is a flow chart of a method for providing demand response to a community based on receipt of demand response commands from a utility to reduce or turn off power to specific appliances or types of appliances.

FIG. 11 discloses steps of a method for providing demand response to a community based on receipt of demand response commands from a utility to reduce or turn off power to specific appliances or types of appliances. At block 1110, the disclosed community energy management system (CEMS) receives a command from the utility to turn off or adjust power to specific appliances. At block 1130, the CEMS generates a command to control smart plugs or smart appliances—optionally via an SDMS—at specific unit(s) to execute the command, turning off or adjusting power to the specific appliances. At block 1120, the CEMS receives a command from the utility to turn off or adjust power to specific types of appliances. At block 1130, the CEMS generates a command to control smart plugs or smart appliances—optionally via an SDMS—at specific unit(s) to execute the command, turning off or adjusting power to specific types of appliances.

Figure 12:
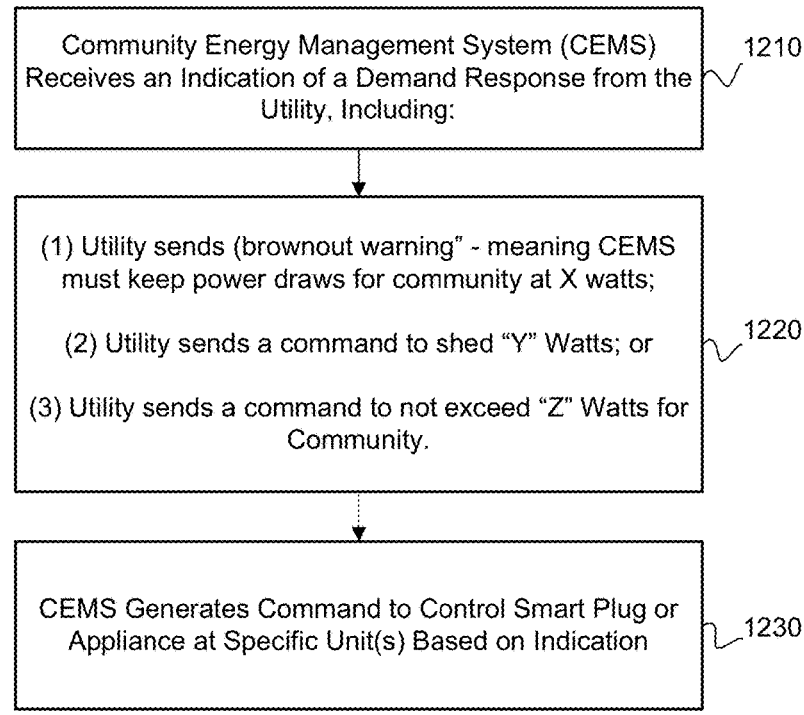
FIG. 12 is a flow chart of a method for providing demand response to a community based on receipt of demand response commands from a utility to react to a brownout warning or a command to shed a certain amount of power or to not exceed a certain amount of power.

FIG. 12 discloses steps of a method for providing demand response to a community based on receipt of demand response commands from a utility to react to a brownout warning or a command to shed a certain amount of power or to not exceed a certain amount of power. At block 1210, the disclosed community energy management system (CEMS) receives an indication of a demand response from the utility, including but not limited to (at block 1220): (1) the utility sends a brownout warning that the CEMs must keep power draws from community within X watts, which could be based on an agreed, contractual amount; (2) the utility sends a command to shed "Y" watts; or (3) the utility sends a command to not exceed "Z" watts for the community, which may be a dynamic, not-previously-agreed-upon amount. At block 1230, the CEMS generates a command to control the smart plug or appliance at specific unit(s) based on the indication.

Figure 13:
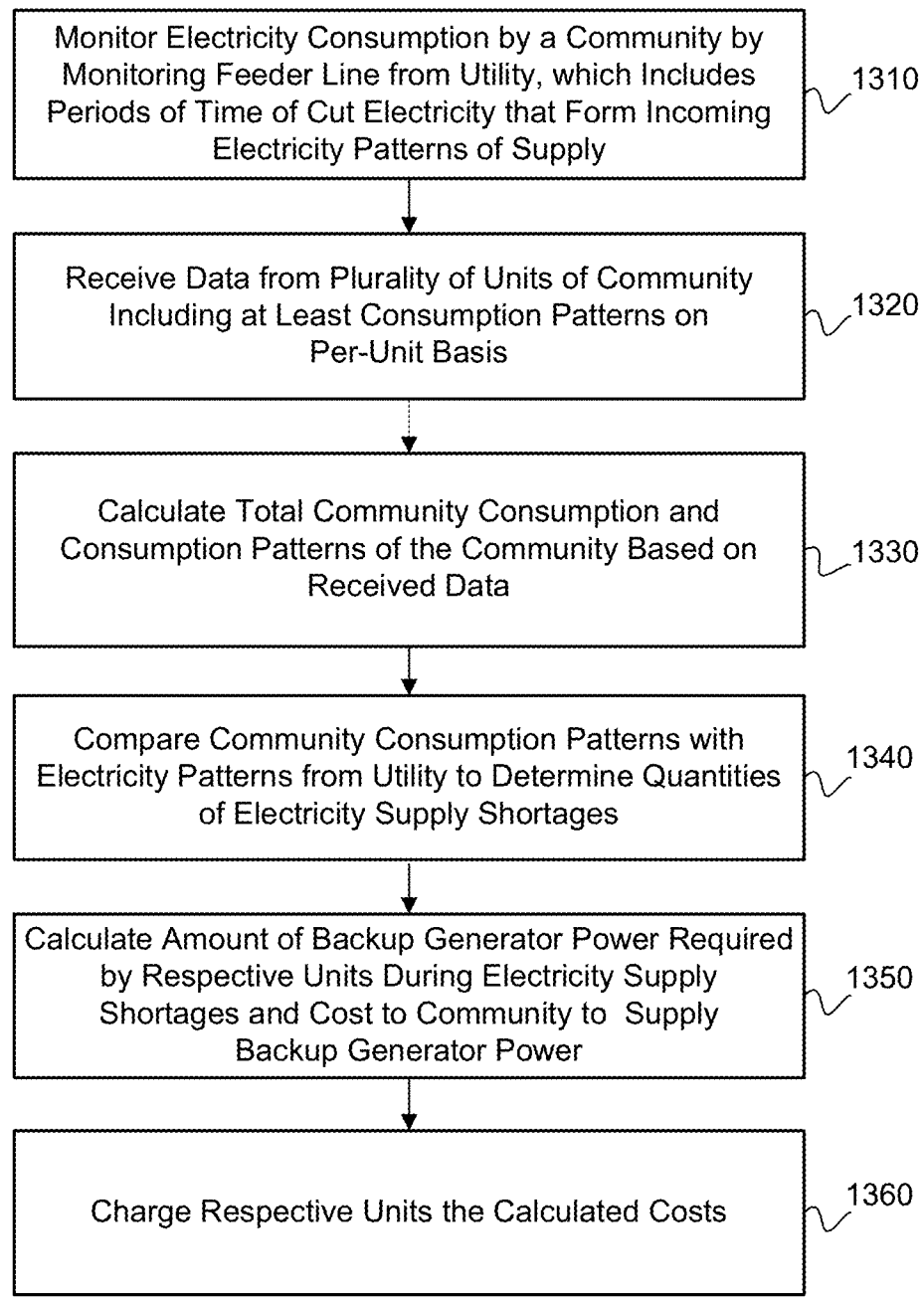
FIG. 13 is a flow chart of a method for monitoring and calculating differential pricing of per-unit backup power consumption.

FIG. 13 is a flow chart of a method for monitoring and calculating differential pricing of per-unit backup power consumption. At block 1310, a disclosed system, such as the CEMS, monitors electricity consumption by a community by monitoring a feeder line from a local utility, including periods of time during which the electricity is reduced or cut, which form incoming electricity patterns of supply. At block 1320, the system receives data from a plurality of units of the community that consume the electricity, the data including at least consumption patterns on a per-unit basis. At block 1330, the system calculates total community consumption and consumption patterns of the community based on at least the received data. At block 1340, the system compares the community consumption patterns with the incoming electricity patterns from the local utility to determine quantities of electricity supply shortages during the periods of time. At block 1350, the system calculates an amount of backup power required by respective units during the electricity supply shortages and a cost to the community to supply the backup power. At block 1360, the system charges the respective units commensurate with the costs.

With respect to the method of FIG. 13, the backup power required by the respective units may be calculated based on backup power configuration details and whether the backup power is provided during a blackout or a brownout. The data received from the units may be sent by the SMDSs, which in turn obtain the data from smart plugs and appliances within respective units.

With respect to the method of FIG. 13, calculating the costs may further include determining differential pricing of respective units depending on a percentage of consumption of the backup power in relation to total backup power consumed by the community.

Figure 14:
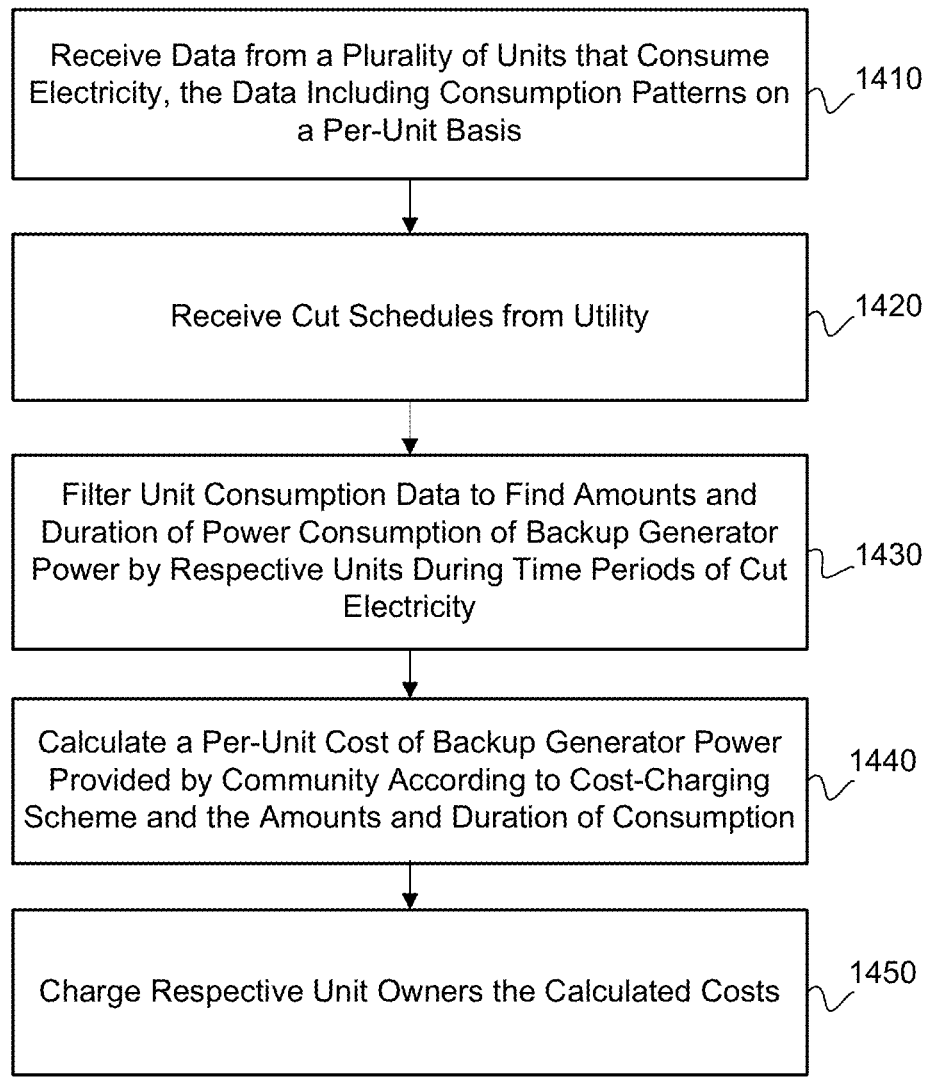
FIG. 14 is a flow chart of a method for filtering unit consumption data during a blackout or brownout to apportion costs of consumption to individual units commensurate with per-unit consumption.

FIG. 14 discloses steps of a method for filtering unit consumption data during a blackout or brownout to apportion costs of consumption to individual units commensurate with per-unit consumption. A disclosed system, such as the CEMS, at block 1410, receives data from a plurality of the units that consume electricity, the data including at least consumption patterns on a per-unit basis. At block 1420, the system receives cut schedules from a local utility that supplies the electricity. At block 1430, the system filters the unit consumption data to find amounts and duration of power consumption by respective units during the time periods the electricity from the local utility is cut, the filtered unit consumption data being the provisioned backup power.

At block 1440, the system calculates a per-unit cost of the backup power provided by the community according to a cost-charging scheme and based on the amounts and duration of consumption to be charged to respective unit owners. The cost-charging scheme may include, for instance, a percentage of consumption of the backup power in relation to total backup power consumed by the community or involve additional or different criteria. At block 1450, the system may charge the respective unit owners the calculated costs or pass them on to the utility for adding to the bills of the unit owners.

With further reference to the method of at least FIG. 14, the system may provide a rebate or discount on a utility bill of an owner of a unit that accepts additional reduction in backup power. The system may also charge a surcharge as an additional cost on a utility bill of an owner of a unit that requests and receives exemption to electricity consumption reduction required by the one or more rules. The system may receive the data from smart device management systems (SDMSs) of respective units, each smart device management system in communication with one or more smart plugs or smart appliances at the respective unit.

Figure 15:
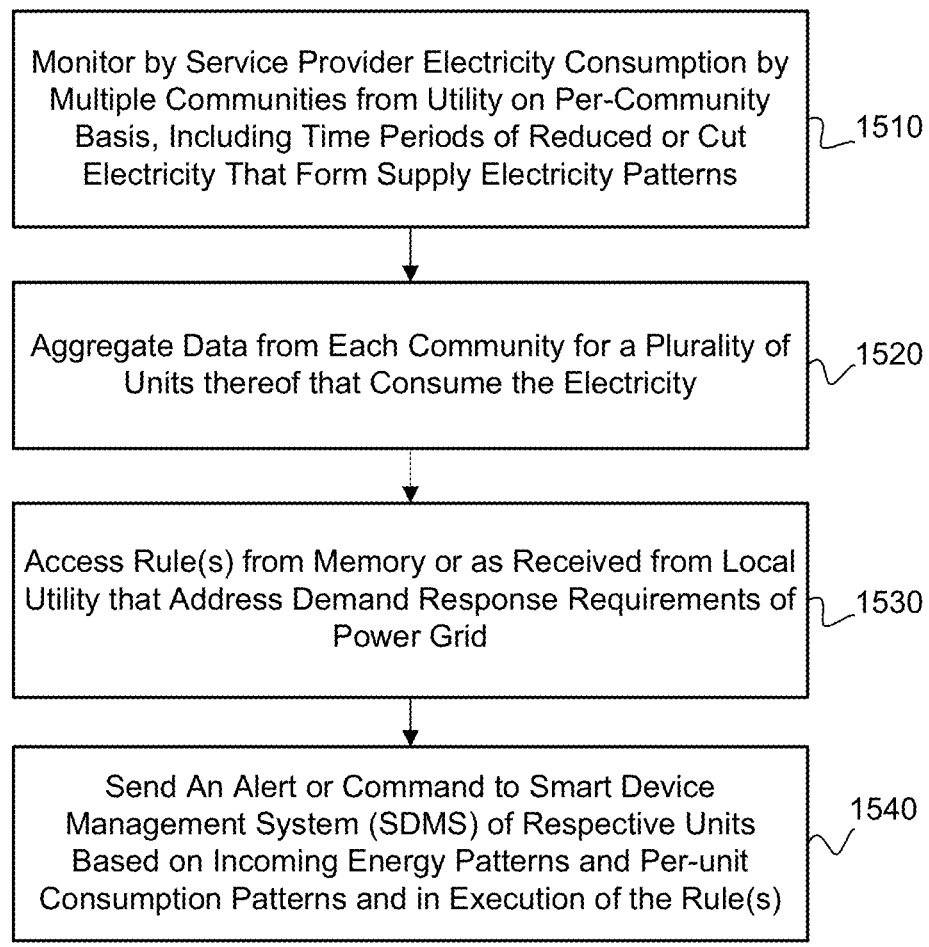
FIG. 15 is a flow chart of a method for monitoring and executing rules that generate alerts or commands that are sent to SDMS's of units of the community to further community electricity usage objectives.

FIG. 15 discloses steps of a method for monitoring and executing rules that generate alerts or commands that are sent to smart device management systems (SDMS's) of units of the community to further community electricity usage objectives. At block 1510, a disclosed system, such as the CEMS, monitors electricity consumption by a community by monitoring a feeder line from a local utility, including periods of time during which the electricity is cut or reduced, which form incoming electricity patterns of supply. At block 1520, the system receives data from a plurality of units of a community that consume the electricity, the data including at least consumption patterns on a per-unit basis. At block 1530, the system accesses one or more rules from the memory that address community electricity usage objectives. At block 1540, the system sends an alert or command to a smart device management system (SDMS) of respective units based on the incoming energy patterns and the per-unit consumption patterns, and in execution of the one or more rules to further the community electricity usage objectives.

With further reference to the method of at least FIG. 15, one of the rules may include a maximum threshold limit of electricity consumption allowed by one or more units during the period of time. The system may then charge additional costs on a utility bill of an owner of a unit that consumes more than the maximum threshold limit of electricity during the period of time. This maximum threshold limit may be generated by contract between the community and the utility.

The alert may prompt a unit owner to reduce electricity consumption during intervals when electricity demand is more than electricity supply, which the unit owner may do manually at appliances or through a remote control console at which the unit owner may direct the SDMS to disconnect or adjust electricity to a smart appliance or a socket of a smart plug into which an appliance is connected. The system may provide a discount or a rebate to the unit owner on a utility bill based on a voluntary reduction in electricity consumption by the unit owner.

The command sent by the system (such as the SDMS or CEMS) may include an instruction to an appliance or a socket of a smart plug at a unit to disconnect or adjust electricity to the appliance or to an appliance plugged into the socket, and may provide a discount or a rebate to an owner of the unit on a utility bill based on the disconnection or adjustment of the electricity to the appliance. The appliance may be of a predetermined type targeted by the one or more rules. The system may provide an additional monetary (or other kind of) incentive to the owner for acceptance of reduction in electricity consumption in addition to that required by the one or more rules.

At least one of the rules may include an exemption received from the SDMS on behalf of an identified unit, the exemption indicative of a preference of an owner that an identified appliance of the identified unit not receive a reduction in electricity consumption. The system may then send one or more commands to the SDMS to disconnect or adjust electricity consumed by one or more appliances in units other than the identified unit. The system may also log a command override for the identified unit for use in assessing a surcharge to the owner for the electricity consumption contrary to a previously-sent command. The system may also instruct the SDMS to reduce or eliminate electricity supplied to one or more appliances of the identified unit, according to a previously-sent command.

With further reference to the methods of at least FIGS. 13 and 15, the system may also classify the periods of time cut electricity as scheduled or ad-hoc to aggregate historical reasons for the periods of cut electricity, to provide patterns for future comparison and prediction of cut electricity. This may also be used by the system in calculating or dimensioning backup power generation capacity.

The system may also provide a social (or user) interface to unit owners through the SDMSs of the respective units or through a web or mobile interface, or any combination thereof. The social interface may include a graphical user interface (GUI) displayable through a display screen and configured to display consumption data, cost information and penalties and incentives to respective unit owners related to use of the backup power on a per-unit basis. The social interface may be further configured to display comparative standings in electricity consumption as compared to averages, and best and worst electricity consumption by the units of the community.

Figure 16:
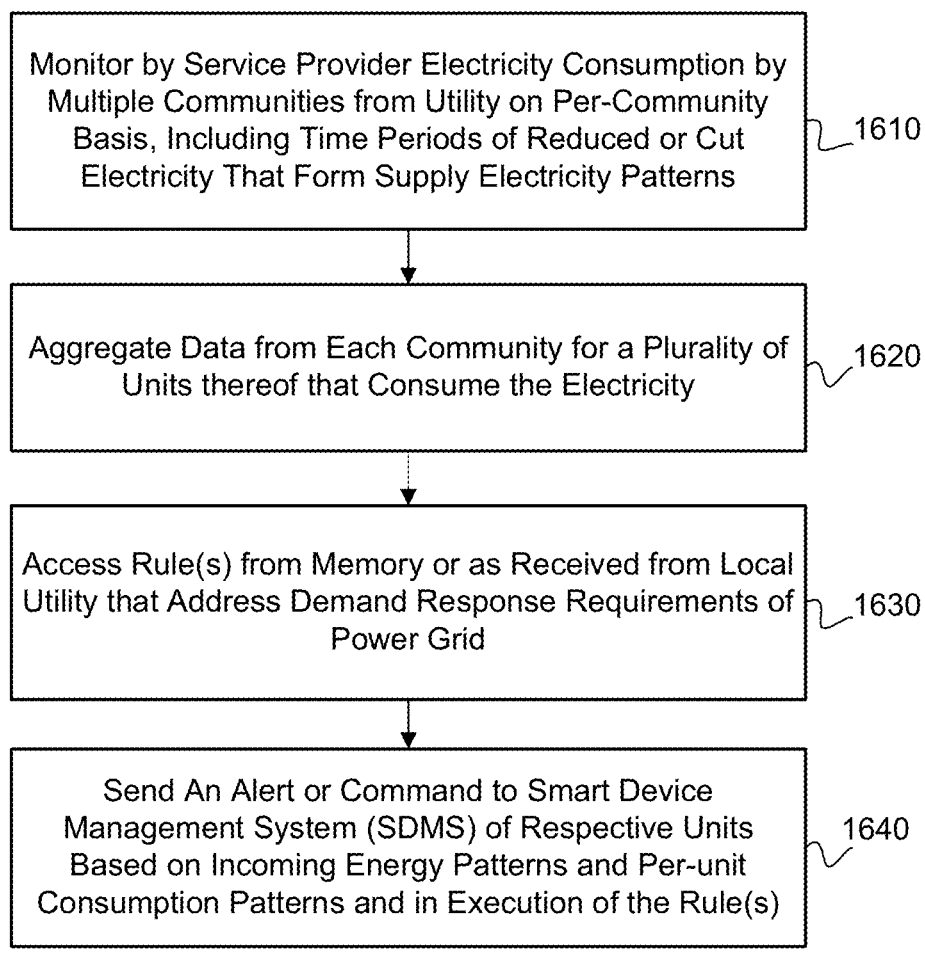
FIG. 16 is a flow chart of a method for a third party service provider to aggregate community consumption data, and to execute demand response within the communities on behalf of a local utility by sending alerts or commands to SDMS's of respective units of the communities.

FIG. 16 discloses steps of a method for a third party service provider to aggregate community consumption data, and to execute demand response within the communities on behalf of a local utility by sending alerts or commands to smart device management systems (SDMS) of respective units of the communities. At block 1610, a disclosed system, such as a computing device having at least one processor of a third party service provider, monitors electricity consumption by a plurality of communities by monitoring respective feeder lines from a local utility for each community, including periods of time during which the electricity is cut or reduced, which form incoming electricity patterns of supply for the respective communities. At block 1620, the system aggregates data from each community for a plurality of units of each community that consume the electricity, the data including at least consumption patterns on a per-unit basis.

At block 1630, the system accesses one or more rules from the memory or receives the one or more rules from the local utility that address demand response requirements of the local utility executable at a micro level of the units. At block 1640, the system sends an alert or command to a smart device management system (SDMS) of respective units of the communities based on the incoming energy patterns and the per-unit consumption patterns, and in execution of the one or more rules to reduce a likelihood of a blackout or a brownout in the local utility.

With further reference to FIG. 16, the alert may prompt a unit owner to reduce electricity consumption during intervals when electricity demand is more than electricity supply. The system may provide a discount or a rebate to the unit owner on a utility bill passed on from the local utility, and based on a voluntary reduction in electricity consumption by the unit owner. The system may also charge the community a fee for passing on the discount or rebate, the community corresponding to the unit of the unit owner. The system may also charge the local utility a fee for executing the demand response according to the one or more rules provided by the local utility.

The command referred to in FIG. 16 may include an instruction to a smart appliance or a socket of a smart plug at a unit to disconnect or adjust electricity to the smart appliance or to an appliance plugged into the socket. The system may further provide a discount or a rebate to an owner of the unit on a utility bill passed on from the local utility and based on the disconnection or adjustment of the electricity to an appliance. The system may charge the community corresponding to the unit a fee for passing on the discount or rebate.

With further reference to FIG. 16, the system may also send the aggregate of the data from the communities to the local utility; receive from the local utility cut schedules and incentives to pass on to the communities for reducing electricity consumption during time periods of the cut schedules based on respective consumption patterns; and manage the incentives with respect to respective communities based on corresponding consumption patterns and the one or more rules.

A method may be drawn to a community energy management system to control power consumption in a power grid system, the power grid system including a central authority, the community energy management system, and a plurality of consuming units, the community energy management system controlling a community of the consuming units, the community of consuming units being less than all of the plurality of consuming units. The method may include, receiving, by the community energy management system, at least one rule from the central authority, the at least one rule indicative of changing at least one aspect of power consumption in the community of consuming units. The method may further include determining, by the community energy management system based on receiving the at least one rule, one or more appliance commands for controlling power consumption to one or more appliances in the community of consuming units; and sending the one or more commands to the community in order to modify the power consumption in the community of consuming units.

With respect to this method, the at least one rule from the central authority may include a quota of electricity for consumption by the community, where the method further includes determining, by the community energy management system based on the at least one rule, which appliances to control in order to reduce the power consumption in the community of consuming units. With respect to this method, determining one or more appliance commands may further include considering one or more community rules simultaneously with the at least one rule from the central authority on which to base the one or more appliance commands.

Another method may be drawn to a community energy management system to control power consumption in a power grid system, the power grid system including a central authority, the community energy management system, and a plurality of consuming units, the community energy management system controlling a community of the consuming units, the community of consuming units being less than all of the plurality of consuming units. The method may include monitoring, by the community energy management system, power supplied to the community of consuming units. The method may further include determining, based on monitoring the power, whether a power outage is occurring. The method may further include supplying one or more of the consuming units in the community with backup power based on determining that a power outage is occurring; and monitoring power consumption on a per-unit level each of the consuming units in the community that are supplied with backup power.

With respect to this other method, calculating a per-unit cost of the backup power may be provided by the community according to a cost-charging scheme and based on the amounts and duration of consumption, the per-unit cost to be charged to respective unit owners.

Figure 17:
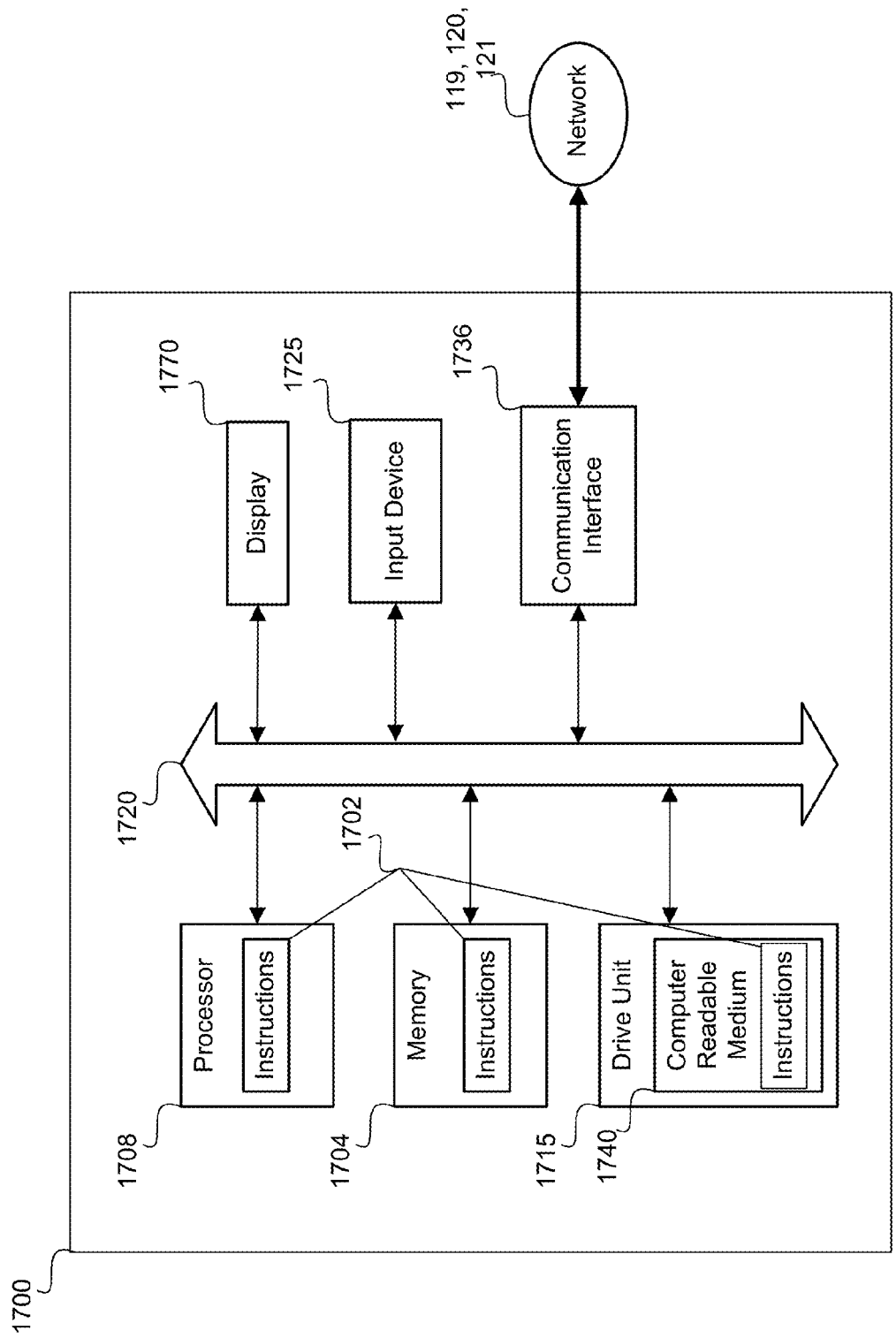
FIG. 17 is a general computer system, programmable to be a specific computer system, which may represent any of the computing devices referenced herein.

FIG. 17 illustrates a general computer system 1700, programmable to be a specific computer system 1700, which may represent any server, computer or component such as a smart plug 30 (or group thereof) of the community energy management system (CEMS) 100 and the smart device management system (SDMS) 50. The computer system 1700 may include an ordered listing of a set of instructions 1702 that may be executed to cause the computer system 1700 to perform any one or more of the methods or computer-based functions disclosed herein. The computer system 1700 may operate as a stand-alone device or may be connected, e.g., using the network 119, 120, and/or 121, to other computer systems or peripheral devices.

In a networked deployment, the computer system 1700 may operate in the capacity of a server or as a client-user computer in a server-client user network environment, or as a peer computer system in a peer-to-peer (or distributed) network environment. The computer system 1700 may also be implemented as or incorporated into various devices, such as a personal computer or a mobile computing device capable of executing a set of instructions 1702 that specify actions to be taken by that machine, including and not limited to, accessing the Internet or Web through any form of browser. Further, each of the systems described may include any collection of sub-systems that individually or jointly execute a set, or multiple sets, of instructions to perform one or more computer functions.

The computer system 1700 may include a memory 1704 on a bus 1720 for communicating information. Code operable to cause the computer system to perform any of the acts or operations described herein may be stored in the memory 1704. The memory 1704 may be a random-access memory, read-only memory, programmable memory, hard disk drive or any other type of volatile or non-volatile memory or storage device.

The computer system 1700 may include a processor 1708, such as a central processing unit (CPU) and/or a graphics processing unit (GPU). The processor 1708 may include one or more general processors, digital signal processors, application specific integrated circuits, field programmable gate arrays, digital circuits, optical circuits, analog circuits, combinations thereof, or other now known or later-developed devices for analyzing and processing data. The processor 1708 may implement the set of instructions 1702 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The computer system 1700 may also include a disk or optical drive unit 2015. The disk drive unit 1715 may include a computer-readable medium 1740 in which one or more sets of instructions 1702, e.g., software, can be embedded. Further, the instructions 1702 may perform one or more of the operations as described herein. The instructions 1702 may reside completely, or at least partially, within the memory 1704 and/or within the processor 708 during execution by the computer system 1700. Accordingly, the databases in discussed above in FIGS. 3 through 5 may be stored in the memory 1704 and/or the disk unit 1715: the smart appliance data database 304; the incoming energy database 402, the logs database 404, the SDMS raw data database 406, the community patterns database 408 and the databases 304 of FIG. 7.

The memory 1704 and the processor 1708 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 1700 may include an input device 1725, such as a keyboard or mouse, configured for a user to interact with any of the components of system 1700. It may further include a display 1770, such as a liquid crystal display (LCD), a cathode ray tube (CRT), or any other display suitable for conveying information. The display 1770 may act as an interface for the user to see the functioning of the processor 1708, or specifically as an interface with the software stored in the memory 1704 or the drive unit 1715.

The computer system 1700 may include a communication interface 1736 that allows communications via the networks 119, 120 and/or 121. The networks 119, 120 and/or 121 may include wired networks, wireless networks, or combinations thereof. The communication interface 1736 network may allow communications via any number of communication standards, such as 402.11, 402.17, 402.20, WiMax, 402.15.4, cellular telephone standards, or other communication standards. Just because one of these standards is listed does not mean any one is preferred as any number of these standards may never actually be adopted in a commercial product.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes all the features allowing the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The above-disclosed subject matter is to be considered illustrative, and not restrictive, and the appended claims are intended to cover all such modifications, enhancements, and other embodiments, which fall within the true spirit and scope of the present disclosure. For instance, steps of methods cited in flow charts or elsewhere are not to imply a required order unless specially recited to require such an order. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

The invention claimed is:

1. A method executable using at least one computer having at least one processor and memory located within a community energy management system (CEMS), the method comprising:
   receiving power supply data from a sensor of the CEMS at a first hierarchical control level of the CEMS, the power supply data comprising information of electricity supplied to a community by monitoring a feeder line from a local utility to the community, the community comprising a plurality of power consuming units at a second hierarchical control level of the CEMS, and each power consuming unit being a customer site, wherein each power consuming unit includes a plurality of power consuming appliances;
   dynamically sensing one or more time periods for which backup power is provided to the community based on the received power supply data indicating the feeder line from the local utility to the community is not adequately supplying power to the community, the backup power being from backup energy sources allocated to supply power to the entirety of the community;
   collecting at a second hierarchical control level of the CEMS during the one or more time periods, using appliance sensors associated with respective appliances in respective power consuming units, power consumption data indicative of individual consumption of electricity by the plurality of respective appliances in each of the plurality of power consuming units of the community;
   generating aggregated information at the second hierarchical control level, the aggregated information comprising the power consumption data aggregated to be indicative of power consumption of respective power consuming units;
   transmitting the aggregated information from the second hierarchical control level of the CEMS over a network to the first hierarchical control level of the CEMS;
   dynamically monitoring, at the first hierarchical control level, power consumption of respective power consuming units;
   estimating, at the first hierarchical control level of the CEMS, future backup power requirements of each of the power consuming units based on the aggregated information and a determination of backup power dynamically consumed by each of the plurality of power consuming units of the community during the one or more time periods for which backup power is provided to the community;
   receiving from the local utility a demand response command to reduce or turn off power consumption within the community;
   generating, at the first hierarchical control level of the CEMS, in response to the demand response command received from the local utility, a command for the second hierarchical control level of the CEMS to dynamically control further power consumption in individual power consuming units such that the backup power is allocated in accordance with community electricity usage objectives of the community, and individual priorities of respective power consuming units; and
   dynamically controlling, at the second hierarchical control level of the CEMS, individual power consumption of at least some of the plurality of appliances included in one or more respective power consuming units based on the command by passing the command through as an executable command to a respective appliance, or by generating at the second hierarchical control level of the CEMS, based on the command, a new executable command to the respective appliance.

2. The method of claim 1, further comprising:
   analyzing, at the first hierarchical control level of the CEMS, the aggregated information of the power consuming units to develop per-power consuming unit consumption patterns; and
   filtering, at the second hierarchical control level of the CEMS, the aggregated information to determine an amount of reduction in power consumption by a power consuming unit from among the power consuming units during a time period for which backup power is provided in comparison to a time period for which backup power is not provided.

3. The method of claim 1, further comprising:
receiving, at the first hierarchical control level of the CEMS, from the second hierarchical control level of the CEMS, an exemption from any demand for electricity consumption reduction, the exemption being for at least one appliance of an identified power consuming unit and being for a time period during which backup power is provided; and
generating and transmitting another command to the second hierarchical control level of the CEMS to exempt the at least one appliance of the identified power consuming unit from a reduction in power consumption due to control at the second hierarchical control level of the CEMS.

4. The method of claim 1, where monitoring power consumption data at the plurality of power consuming units further comprises:
receiving, at the first hierarchical control level of the CEMS from over a network, consumption data from smart device management systems (SDMSs) included in the second hierarchical control level of the CEMS of respective power consuming units, each smart device management system in communication with one or more smart plugs or smart appliances at each respective power consuming unit.

5. The method of claim 4, where the received consumption data includes consumption patterns of electricity on a per-unit basis of respective power consuming units, the method further comprising:
accessing, from the memory, one or more rules that address community electricity usage objectives;
sending an alert, from the first hierarchical control level of the CEMS, over the network to the SDMS of the respective power consuming units based on the consumption patterns of the respective power consuming units; and
executing, with the first hierarchal level of the CEMS, one or more rules indicated in the alert to further the community electricity usage objectives.

6. The method of claim 4, where the received consumption data includes consumption patterns of electricity on a per-unit basis of respective power consuming units, the method further comprising:
receiving, as the demand response, from the local utility at the first hierarchical control level of the CEMS, a not-to-exceed quota of power for consumption during a period of time;
analyzing, at the first hierarchical control level of the CEMS, the consumption data of respective power consuming units;
selecting, at the first hierarchical control level of the CEMS, at least one of the one or more smart plugs or smart appliances according to historical consumption rates of the one or more smart plugs or smart appliances; and
sending the command to the SDMSs of the respective power consuming units, the command indicative to the SDMSs to disconnect or adjust power to the selected smart plugs or smart appliances, such that the power consumption of the community does not exceed the quota of power for consumption during said period of time.

7. The method of claim 4, further comprising:
sending, over the network from the first hierarchical control level of the CEMS an electronic communication to a unit owner of a power consuming unit included among the plurality of power consuming units, via the SDMS at said power consuming unit or through a web or mobile interface, or any combination thereof,
where the SDMS is configured to drive a display screen using the electronic communication to display, on an interface comprising a graphical user interface, consumption data to said unit owner for use of the backup power.

8. The method of claim 7, where the SDMS is further configured to drive a display screen using the electronic communication to display comparative standings in electricity consumption as compared to averages, and best and worst electricity consumption by each of the respective power consuming units of the community.

9. The method of claim 1, where the computer comprises two or more computers, where at least a second computer operable at the second hierarchical control level of the CEMS is in communication over a network with at least a second computer operable at the first hierarchical control level of the CEMS.

10. A method executable using at least one computer, having at least one processor and memory, of a service provider of a plurality of communities of customer sites, the method comprising:
monitoring, supply data received from a plurality of sensors of a plurality of different respective community energy management systems (CEMSs) of respective different communities, the supply data comprising electricity supplied to each of the plurality of communities by monitoring, at a first hierarchical control level of the CEMS, respective feeder lines from a local utility for each respective community, each community comprising a plurality of customer sites, and each of the communities being a subset of a power grid;
developing, at the first hierarchical control level of the CEMS, patterns of incoming electricity supply for the respective communities by identifying periods of time during which the electricity supplied from the local utility is cut or reduced based on the supply data;
aggregating data of the plurality of customer sites from each community at a second hierarchical control level of the CEMS, the aggregated data received over a network from a smart device management system (SDMS) of each respective customer site, the SDMS included in the second hierarchical control level of the CEMS and, the aggregated data including combined individual power consumption of respective appliances included on respective customer sites to indicate at least consumption patterns of the customer sites on a per-unit basis;
comparing, at the first hierarchical control level of the CEMS, the aggregated data of the plurality of customer sites from each community and the developed patterns of incoming electricity supply for the respective communities;
accessing, at the first hierarchical control level of the CEMS, one or more rules from the memory, or as received from the local utility, the one or more rules addressing a demand response requirement selectively required by the local utility to reduce power consumption of the community, the one or more rules being executable at a micro level for each of the customer sites, to dynamically determine a reduction in power consumption of individual customer sites at each monitored community to proactively reduce a likelihood of a blackout or a brownout in the local utility, where the blackout comprises a cut and the brownout comprises a reduction in supply of electricity from the local utility to the respective monitored community via a respective feeder line;

sending over the network, using at least one processor executed at the first hierarchical control level of the CEMS, an alert or command to the SDMS of respective customer sites of the communities based on the comparison of the patterns of incoming electricity supply for the respective communities and the consumption patterns of the respective customer sites on the per-unit basis, the alert or command indicating an execution of the one or more rules to reduce the likelihood of the blackout or the brownout in the local utility; and controlling, at the second hierarchical control level of the CEMS, power consumption of the respective appliances included on respective customer sites by execution of the one or more rules.

11. The method of claim 10, where the alert prompts a customer site from a community to initiate voluntary reduction of electricity consumption at the customer site, and the method further comprises:

identifying, at the second control level of the CEMS, from the individual power consumption of respective appliances included on respective customer sites, a voluntary reduction of electricity consumption at a respective customer site in response to the alert at the SDMS;

generating by execution of the one or more rules at the second control level of the CEMS a command; and sending the command via the SDMS to adjust power consumption of at least one appliance at the respective customer site.

12. The method of claim 10, where the command comprises an instruction configured for execution by an appliance or comprises an instruction configured for a socket of a smart plug at a customer site from a community, the instruction being to disconnect or adjust electricity to the appliance plugged into the socket.

13. The method of claim 10, where the one or more rules are first rules, the method further comprising:

executing, at the second control level of the CEMS, one or more second rules that address respective community electricity usage objectives, where the alert or the command is to further the electricity usage objectives of at least one community.

14. A community energy management system for managing provisioned backup power, comprising:

at least one computer including at least one processor and computer memory;

a network interface coupled with the at least one computer configured to communicate with units of a community over at least one network;

the at least one processor configured to:
receive, at a first hierarchical control level, supply data from sensors that monitor electricity supplied to a community by monitoring a feeder line from a local utility, the community comprising a plurality of consuming units, each consuming unit comprising at least one appliance;

detect, at the first hierarchical control level based on the supply data, a reduction or loss in electricity supplied on the feeder line from the local utility during one or more time periods for which backup power is provided to the community;

receive, at a second hierarchical control level, consumption data from sensors that monitor electricity consumption by the at least one appliance included in each of the plurality of consuming units in the community;

aggregate, at the second hierarchical control level the consumption data to indicate with aggregated consumption data respective power consumption of each of the plurality of consuming units in the community;

transmit from the second hierarchical control level over a network to the first hierarchical control level the aggregated consumption data of each of the plurality of consuming units in the community;

compare, at the first hierarchical control level, the aggregated consumption data and the supply data from the sensors that monitor electricity supplied to the community via the feeder line from the local utility;

dynamically determine, at the first hierarchical control level based on the comparison of the aggregated consumption data and the supply data from the sensors that monitor electricity supplied to the community, backup power consumed by the community on a per-unit basis during the one or more time periods; and dynamically and independently control, at the second hierarchical control level, power consumption of the at least one appliance included in the respective consuming units based on per-unit consumption of the backup power during the one or more time periods.

15. A hierarchical energy management system for executing demand response control over a plurality of communities, each community comprising a respective plurality of units, and each unit comprising a plurality of appliances, the system comprising:

at least one computer including at least one processor and memory;

a network interface coupled with the at least one computer, the network interface configured to communicate with the communities and their units over at least one network;

the at least one processor configured to:
receive, at a first hierarchical control level, electricity supply data from sensors that monitor electricity supplied to each of the plurality of communities by monitoring respective feeder lines from a local utility for each community, to identify incoming electricity patterns of supply for the respective communities based on detection of time periods of cut or reduced electricity supply;

receive electricity consumption data from a smart device management system (SDMS) of each respective unit in the plurality of communities, the SDMS operable at a second hierarchical control level and in communication with the first hierarchical control level over the at least one network;

aggregate, at the second hierarchical control level, electricity consumption data from each community for a plurality of units of each community that consume the electricity, the electricity consumption data including at least consumption patterns on a per-unit basis and power consumption data of respective individual appliances included in each respective unit;

compare, at the first hierarchical control level of the CEMS, the aggregated electricity consumption data from each community for the plurality of units of each community that consume the electricity and the identified incoming electricity patterns of supply for the respective communities;

access, at the first hierarchical control level, one or more rules from the memory, or as received from the local utility, the one or more rules addressing a demand response requirement selectively required by the local utility to reduce power consumption of the communities, the one or more rules executable to apply at a micro level for each of the units to adjust power supply demand of individual units at each monitored community to proactively reduce a likelihood of a blackout or a brownout in the local utility based on a demand response of the local utility; and send an alert or command to the SDMS of the respective units of the communities to which the one or more rules were applied based on comparison of the identified incoming electricity patterns of supply for the respective communities and the consumption patterns on the per-unit basis, to reduce the likelihood of the blackout or the brownout in the local utility by control with the SDMS at the second hierarchical control level, of power consumption of the respective appliances included in respective units based on the alert or command.

16. The method of claim 10, wherein aggregating data further comprises collecting power consumption data at the second hierarchical control level with the SDMS during the periods of time using appliance sensors associated with respective appliances in respective customer sites, the power consumption data comprising aggregated information of individual consumption of electricity by the plurality of respective appliances on each of the customer sites, the aggregated information generated by the SDMS at the second hierarchical control level, and transmitted over the network to the first hierarchical control level.

17. The method of claim 10, further comprising:
dynamically sensing, at the first hierarchical control level, backup power being provided to one of the communities during the time period based on the received supply data for the one of the communities;

dynamically monitoring, at the first hierarchical control level, power consumption data of the one of the communities, the power consumption data collected at the second hierarchical control level during the time period using appliance sensors associated with respective appliances included on respective customer sites which are included in the one of the communities, the power consumption data included in the aggregated data; and estimating, at the first hierarchical control level of the CEMS, future backup power requirements of each of the respective customer sites in the one of the communities based on a determination of backup power dynamically consumed by each of the respective customer sites of the one of the communities during the period for which backup power is provided to the one of the communities.

18. The method of claim 10, wherein the command comprises an instruction to control power of an identified appliance in an identified customer site, and the method comprises the SDMS transmitting the instruction for receipt by the identified appliance, or the command comprises an instruction to control power of an identified customer site, and the method comprises the SDMS identifying an appliance in the identified customer site, and generating a control instruction to control the identified appliance in the identified customer site in accordance with the command.

* * * * *

UNITED STATES PATENT AND TRADEMARK OFFICE
CERTIFICATE OF CORRECTION

PATENT NO. : 9,798,298 B2
APPLICATION NO. : 13/772557
DATED : October 24, 2017
INVENTOR(S) : Vikrant Shyamkant Kaulgod and Sanjoy Paul It is certified that error appears in the above-identified patent and that said Letters Patent is hereby corrected as shown below:

In the Specification

Column 1, Line 4, replace 1299/CHE/2012 with 1299CHE2012

Column 1, Line 5, replace Oct. 26, 2012 with Oct. 29, 2012

Signed and Sealed this
Twenty-fifth Day of September, 2018

Andrei Iancu
*Director of the United States Patent and Trademark Office*